US012786259B2

United States Patent
Maniscalco et al.

(12) United States Patent
(10) Patent No.: US 12,786,259 B2
(45) Date of Patent: Nov. 3, 2026

(54) IDENTIFICATION AND RESOLUTION OF ANOMALIES OVER A NETWORK

(71) Applicant: International Business Machines Corporation, Armonk, NY (US)

(72) Inventors: James Anthony Maniscalco, New York, NY (US); Thomas Jefferson Sandridge, Tampa, FL (US); Noah Joseph Costa, Dix Hills, NY (US); Jacob Thomas Covell, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 18/778,923

(22) Filed: Jul. 20, 2024

(65) Prior Publication Data

US 2026/0025423 A1 Jan. 22, 2026

(51) Int. Cl.
*H04L 65/80* (2022.01)
*G10L 13/047* (2013.01)
(Continued)

(52) U.S. Cl.
CPC ............ *H04L 65/80* (2013.01); *G10L 13/047* (2013.01); *G10L 15/01* (2013.01); *G10L 15/063* (2013.01);
(Continued)

(58) Field of Classification Search
CPC . H04L 65/80; H04L 12/1831; H04L 65/1069; H04L 65/1089; H04L 12/18;
(Continued)

(56) References Cited

U.S. PATENT DOCUMENTS 6,985,855 B2 1/2006 Sluijter et al.
7,433,818 B2 10/2008 Caldwell et al.
(Continued)

FOREIGN PATENT DOCUMENTS

KR 10-2377350 B1 3/2022

OTHER PUBLICATIONS

McClain et al., "The Internet and the Pandemic", https://www.pewresearch.org/internet/2021/09/01/the-internet-and-the-pandemic/, Sep. 1, 2021, 10 pages.
(Continued)

*Primary Examiner* — Tonia L Dollinger
*Assistant Examiner* — Mehulkumar J Shah
(74) *Attorney, Agent, or Firm* — CHIP LAW GROUP

(57) ABSTRACT

Identification and resolution of anomalies over a network include obtaining at least a set of media characteristics associated with media data transmitted from a first entity to a second entity over the network and contextual information associated with at least one of the first entity or the second entity. A first operational score associated with the first entity is determined based on the obtained set of media characteristics and the obtained contextual information. The first operational score is indicative of operating conditions associated with the first entity for the transmission of the media data over the network. Based on a comparison of the first operational score with a threshold, a set of anomalies associated with the first entity is identified. A set of operations to resolve the set of anomalies is determined. The first entity is controlled to execute the determined set of operations on the media data.

20 Claims, 11 Drawing Sheets

(51) Int. Cl.

| | |
|---|---|
| ***G10L 15/01*** | (2013.01) |
| ***G10L 15/06*** | (2013.01) |
| ***G10L 15/26*** | (2006.01) |
| ***G10L 15/30*** | (2013.01) |
| ***H04L 12/18*** | (2006.01) |
| ***H04L 65/1069*** | (2022.01) |
| ***H04L 65/1089*** | (2022.01) |

(52) U.S. Cl.
CPC .............. *G10L 15/26* (2013.01); *G10L 15/30* (2013.01); *H04L 12/1831* (2013.01); *H04L 65/1069* (2013.01); *H04L 65/1089* (2013.01)

(58) Field of Classification Search
CPC ..... G10L 13/047; G10L 15/01; G10L 15/063; G10L 15/26; G10L 15/30; G10L 15/06
See application file for complete search history.

(56) References Cited

U.S. PATENT DOCUMENTS

| | | | | |
|---|---|---|---|---|
| 8,594,293 | B2 | 11/2013 | Jeong et al. | |
| 9,614,969 | B2 | 4/2017 | Aue et al. | |
| 12,326,869 | B1 * | 6/2025 | Alperin | G06N 3/04 |
| 2015/0170651 | A1 | 6/2015 | Arenburg et al. | |
| 2019/0073993 | A1 | 3/2019 | Cutler et al. | |
| 2020/0195662 | A1 * | 6/2020 | Black | H04L 63/123 |
| 2020/0342896 | A1 | 10/2020 | Kanai | |
| 2020/0357387 | A1 * | 11/2020 | Prabhavalkar | G06N 3/044 |
| 2023/0059158 | A1 | 2/2023 | Munoz et al. | |
| 2023/0113297 | A1 * | 4/2023 | Bonafonte | G10L 13/047<br>704/232 |
| 2023/0156024 | A1 * | 5/2023 | Olson | G06Q 30/0248<br>726/23 |
| 2023/0260501 | A1 * | 8/2023 | Trueba | G06F 3/16<br>704/200 |
| 2023/0368794 | A1 | 11/2023 | Karp | |
| 2024/0386015 | A1 * | 11/2024 | Crabtree | G06F 16/9024 |

OTHER PUBLICATIONS

No Author, "99firms", https://web.archive.org/web/20240327012947/https://99firms.com/, Mar. 27, 2024, 5 pages.

* cited by examiner

IDENTIFICATION AND RESOLUTION OF ANOMALIES OVER A NETWORK

BACKGROUND

The disclosure relates to network management and more particularly, to identification and resolution of anomalies over a network.

With the advancement of communication technologies, the number of entities connected to the Internet has increased, and the volume of media data (such as audio, video, or text) communicated among the entities over the Internet has also increased. The entities include computing devices, mainframe machines, servers, computer workstations, smartphones, and the like. Media communications (such as conference calls) are widely conducted in various sectors (such as corporate sectors, legal sectors, and healthcare sectors) to facilitate real-time communication of the media data among users located in multiple locations. The conduction of the conference calls over network further increases efficiency and convenience of collaboration among the entities. However, various anomalies may occur over the network that may lead to challenges in comprehension of the communicated media data by the users during the conference calls. Various anomalies may include a decrease in a bandwidth associated with the entities, an increase in a packet loss associated with the communicated media data, an increase in traffic over the network, and a fault event associated with the entities (such as hardware failure).

For example, variability in data upload speed at a first entity during transmission of the media data to a second entity over the network can lead to distortions in the audio included in the media data. Additionally, a resolution of the video included in the media data can decrease. Further, due to the distortions in the audio or the decrease in the resolution of the video, a second user associated with the second entity may be unable to comprehend the media data communicated by a first user associated with the first entity. To this end, manual monitoring and identification of various anomalies is labor-intensive and prone to human error and delay. Additionally, variability in the perception of the media data by different users can further cause challenges in the identification of anomalies over the network. For example, the second user may be unable to comprehend the audio included in the media data due to low hearing sensitivity as compared to the hearing sensitivity of the first user. Hence, there is a need to identify and resolve various anomalies that may occur over the network to provide efficient communication for the users.

SUMMARY

According to an embodiment of the disclosure, a computer-implemented method for identification and resolution of anomalies over a network is described. The computer-implemented method includes obtaining, by a computer, at least a set of media characteristics associated with media data transmitted from a first entity to a second entity over the network and contextual information associated with at least one of the first entity or the second entity. The computer-implemented method further includes determining, by the computer, a first operational score associated with the first entity based on at least the obtained set of media characteristics and the obtained contextual information. The first operational score is indicative of operating conditions associated with the first entity for the transmission of the media data over the network. The computer-implemented method further includes identifying, by the computer, a set of anomalies associated with the first entity based on a comparison of the first operational score with a threshold. The computer-implemented method further includes determining, by the computer, a set of operations for resolving the set of anomalies associated with the first entity. The computer-implemented method further includes controlling, by the computer, the first entity to execute the determined set of operations on the media data.

According to one or more embodiments of the disclosure, a system for identification and resolution of anomalies over a network is described. The system performs a method for identification and resolution of anomalies over the network. The method includes obtaining at least a set of media characteristics associated with media data received by a first entity from a second entity over the network and contextual information associated with at least one of the first entity or the second entity. The method further includes determining a first operational score associated with the first entity based on at least the obtained set of media characteristics and the obtained contextual information. The first operational score is indicative of operating conditions associated with the first entity for the reception of the media data over the network. The method further includes identifying a set of anomalies associated with the first entity based on a comparison of the first operational score with a threshold. The method further includes determining a set of operations to resolve the set of anomalies associated with the first entity. The method further includes controlling the second entity to execute the determined set of operations on the media data.

According to one or more embodiments of the disclosure, a computer program product for identification and resolution of anomalies over a network is described. The computer program product includes a computer-readable storage medium having program instructions embodied therewith, the program instructions executable by a system to cause the system to obtain at least a set of media characteristics associated with media data communicated between a first entity and a second entity via the system over the network and contextual information associated with at least one of the first entity or the second entity. The program instructions further include determining a first operational score associated with the system based on at least the obtained set of media characteristics and the obtained contextual information. The first operational score is indicative of operating conditions associated with the system for the communication of the media data over the network. The program instructions further include identifying a set of anomalies associated with the system based on a comparison of the first operational score with a threshold. The program instructions further include determining a set of operations to resolve the set of anomalies associated with the system. The program instructions further include executing the determined set of operations on the media data.

Additional technical features and benefits are realized through the techniques of the disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following description will provide details of preferred embodiments with reference to the following figures wherein.

DETAILED DESCRIPTION

Figure 1:
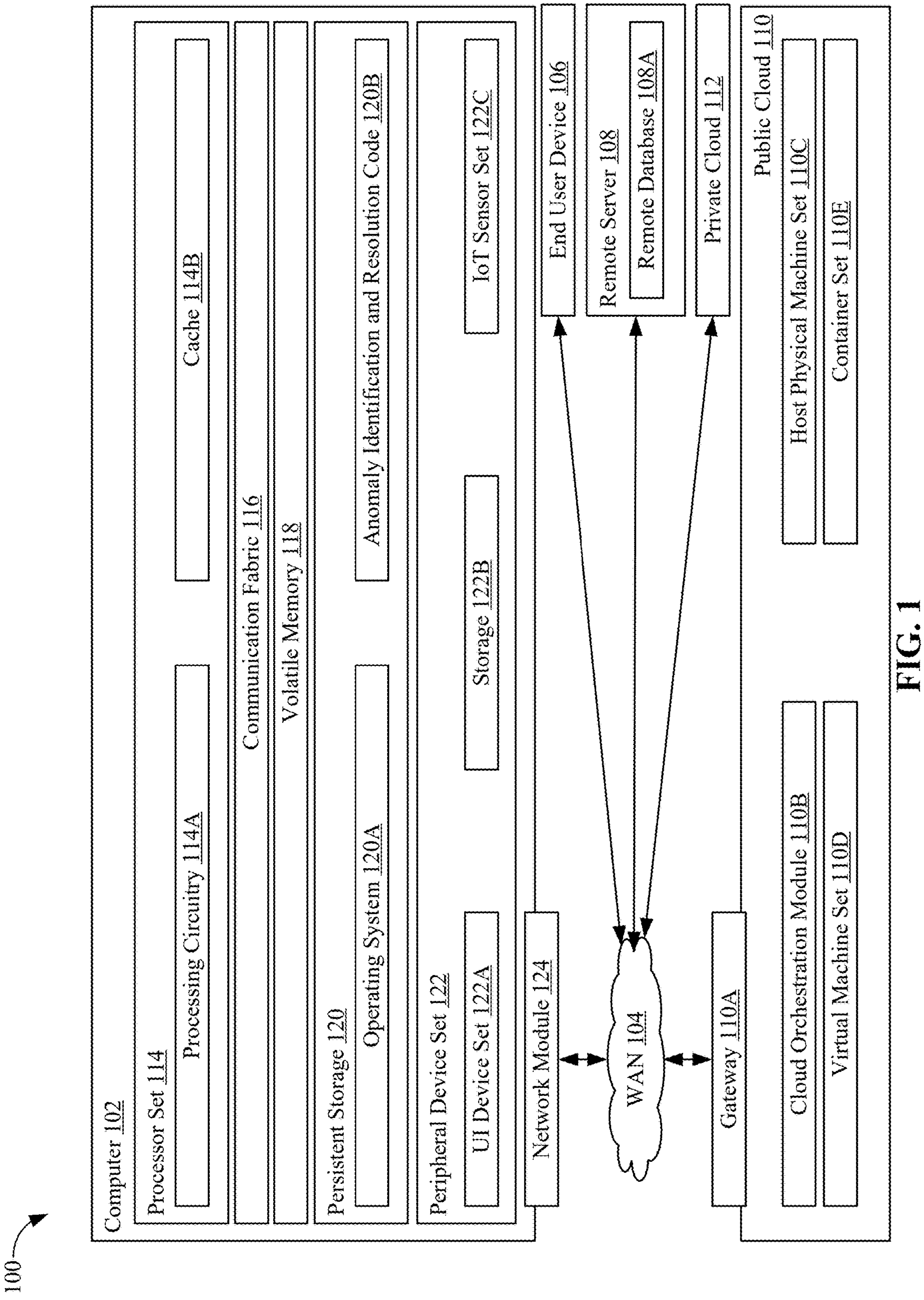
FIG. 1 is a diagram that illustrates a computing environment for identification and resolution of anomalies over a network, in accordance with an embodiment of the disclosure.

Media communications (such as conference calls) are widely conducted in various sectors (such as corporate sectors, legal sectors, and healthcare sectors) to facilitate real-time communication of media data among participants located over a network, but in multiple locations.

However, various anomalies may occur over the network that may lead to challenges in comprehension of the communicated media data by the participants during diverse types of communications, such as during conference calls. Various anomalies may include, but are not limited to, a decrease in a bandwidth associated with the entities, an increase in a packet loss associated with the communicated media data, an increase in traffic over the network, and a fault event associated with the entities (such as hardware failure).

Variability in a data download speed at a first entity during reception of the media data from a second entity over the network can lead to distortions in the audio included in the media data or a decrease in a resolution of the video included in the media data. Also, fault events (such as the hardware failure) at a server communicating the media data between the first entity and the second entity may lead to the distortions in the audio included in the media data or the decrease in the resolution of the video included in the media data. To this end, manual monitoring, and identification of various anomalies over the network is labor-intensive and prone to human error and delay. Additionally, variability in a perception of the media data by different participants can further cause challenges in the identification of anomalies over the network. For example, a first participant associated with the first entity may be unable to comprehend the audio included in the media data due to a low hearing sensitivity as compared to a hearing sensitivity of a second participant associated with the second entity.

Hence, to provide efficient communication among the participants over the network, there is a need for a system that can identify the anomalies that occurred over the network and determine operations to resolve the anomalies over the network. The system may leverage machine learning models, natural language processing, and real-time monitoring to identify and resolve the anomalies over the network.

In an embodiment of the disclosure, to provide efficient communication for the participants, the system may be configured to automatically identify the anomalies during the communication of the media data over the network. The system may be further configured to determine operations to resolve the identified anomalies over the network. In an embodiment of the disclosure, the operations include an encoding of the communicated media data to reduce the size of the communicated media data. The reduction in the size of the communicated media data allows an increase in the data upload speed during transmission of the media data from the first entity to the second entity. In another embodiment of the disclosure, the operations further include a decoding of the encoded media data for the reception of the encoded media data at the second entity. Additionally, the system may be further configured to execute the determined operations entirely or at least partially on entities connected to the network. In an embodiment of the disclosure, the system may be further configured to employ machine learning algorithms to execute the operations. In another embodiment of the disclosure, the system may be further configured to predict a likelihood of the comprehension of the communicated media data by the participants associated with the communication of the media data. By identifying and resolving anomalies over the network, the system may be capable of minimizing the inconvenience of the participants during the conference calls. Moreover, the system may be further configured to iteratively monitor each entity connected to the network for identification and resolution of anomalies. Upon detection of a potential or an actual anomaly, the system may be further configured to automatically provide indication about occurrence of such anomalies to the participants via rendering information relating to the identified anomalies or the determined operations (such as a name of the identified anomaly or the determined operations).

According to an embodiment of the disclosure, a computer-implemented method for identification and resolution of anomalies over a network is described. The computer-implemented method includes obtaining, by a computer, at least a set of media characteristics associated with media data transmitted from a first entity to a second entity over a network and contextual information associated with at least one of the first entity or the second entity. The computer-implemented method further includes determining, by the computer, a first operational score associated with the first entity based on at least the obtained set of media characteristics and the obtained contextual information. The first operational score is indicative of operating conditions associated with the first entity for the transmission of the media data over the network. The computer-implemented method further includes identifying, by the computer, a set of anomalies associated with the first entity based on a comparison of the first operational score with a threshold. The computer-implemented method further includes determining, by the computer, a set of operations for resolving the set of anomalies associated with the first entity. The computer-implemented method further includes controlling, by the computer, the first entity to execute the determined set of operations on the media data.

In an embodiment of the disclosure, the contextual information includes context cue information indicative of a comprehension of at least a first portion of the media data by a participant associated with the second entity.

In an embodiment of the disclosure, the set of media characteristics includes at least one of a type of the media data, a resolution of the media data, a duration of media associated with the media data, timestamp data of the media associated with the media data, first bandwidth data associated with the transmission of the media data from the first entity, second bandwidth data associated with reception of the media data at the second entity, a rate of packet loss associated with communication of the media data, or an encryption state of the media data.

In an embodiment of the disclosure, the computer-implemented method further includes obtaining, by the computer, entity information associated with the first entity and the second entity. The entity information includes at least one of entity type information, entity identifier information, entity network information, entity location information, entity participant data, entity resource information, or entity status information.

In an embodiment of the disclosure, the set of operations includes at least one of an encoding operation, a decoding operation, a backup operation, a session re-initiation operation, a bandwidth throttling operation, a rate limiting operation, or a load balancing operation.

In an embodiment of the disclosure, the encoding operation includes controlling, by the computer, the first entity to obtain audio data associated with the media data. The audio data includes at least a first speech of a participant associated with the first entity. The encoding operation further includes controlling, by the computer, the first entity to generate text data including at least a text corresponding to the first speech of the participant associated with the first entity. The text data is generated based on the obtained audio data. The size of the text data is less than a size of the audio data.

In an embodiment of the disclosure, the text data further includes a set of speech characteristics associated with the first speech of the participant. The set of speech characteristics includes at least one of a tone of the first speech, a pitch of the first speech, a rate of the first speech, an intensity of the first speech, a total number of words in the first speech, an accent in the first speech, or a pattern of pauses in the first speech.

In an embodiment of the disclosure, the encoding operation further includes controlling, by the computer, the first entity to generate the text data. The text data is generated based on an application of a set of machine learning (ML) models on the obtained audio data.

In an embodiment of the disclosure, the set of ML models includes a first ML model trained to generate the text data. The text data is generated based on at least the first speech of the participant included in the obtained audio data.

In an embodiment of the disclosure, the decoding operation includes generating, by the computer, natural audio data based on the generated text data. The natural audio data includes at least a second speech corresponding to the text included in the generated text data.

In an embodiment of the disclosure, the decoding operation further includes generating, by the computer, the natural audio data based on the application of the set of ML models on the generated text data. The set of ML models further includes a second ML model trained to generate the natural audio data. The natural audio is generated based on at least the text included in the generated text data.

In an embodiment of the disclosure, the computer-implemented method further includes controlling, by the computer, the second entity to output at least the second speech corresponding to the text included in the generated text data.

In an embodiment of the disclosure, the set of ML models is trained based on training data. The training data includes at least one of a first data set including historical data associated with historical communication events between the first entity and the second entity over the network, or a second data set including training speech data associated with the participant.

In an embodiment of the disclosure, the computer-implemented method further includes determining, by the computer, a set of performance scores based on each operation of the set of operations. The computer-implemented method further includes selecting, by the computer, a first operation of the set of operations. A first performance score of the first operation is the highest among the set of performance scores. The computer-implemented further includes controlling, by the computer, the first entity to execute the selected first operation of the set of operations on the media data.

According to another embodiment of the disclosure, a system for identification and resolution of anomalies over a network is described. The system performs a method for identification and resolution of anomalies over the network. The method includes obtaining at least a set of media characteristics associated with media data received by a first entity from a second entity over the network and contextual information associated with at least one of the first entity or the second entity. The method further includes determining a first operational score associated with the first entity based on at least the obtained set of media characteristics and the obtained contextual information. The first operational score is indicative of operating conditions associated with the first entity for the reception of the media data over the network. The method further includes identifying a set of anomalies associated with the first entity based on a comparison of the first operational score with a threshold. The method further includes determining a set of operations to resolve the set of anomalies associated with the first entity. The method further includes controlling the second entity to execute the determined set of operations on the media data.

In an embodiment of the disclosure, the contextual information includes context cue information indicative of a comprehension of at least a first portion of the media data by a participant associated with the first entity.

In an embodiment of the disclosure, the set of operations includes at least one of an encoding operation, a decoding operation, a backup operation, a session re-initiation operation, a bandwidth throttling operation, a rate limiting operation, or a load balancing operation.

In an embodiment of the disclosure, to execute the encoding operation, the system is configured to perform operations that include controlling the second entity to obtain audio data associated with the media data. The audio data includes at least the first speech of a participant associated with the second entity. The system is further configured to perform operations that include generating text data based on the obtained audio data. The text data includes at least a text corresponding to the first speech of the participant associated with the second entity. A size of the text data is less than the size of the audio data.

In an embodiment of the disclosure, to execute the decoding operation, the system is further configured to perform operations that include controlling the first entity to generate natural audio data including at least a second speech corresponding to the text included in the generated text data. The natural audio data is generated based on the generated text data.

According to yet another embodiment of the disclosure, a computer program product for identification and resolution of anomalies over a network is described. The computer program product includes a computer-readable storage medium having program instructions embodied therewith, the program instructions executable by a system to cause the system to obtain at least a set of media characteristics associated with media data communicated between a first entity and a second entity via the system over the network and contextual information associated with at least one of the first entity or the second entity. The program instructions further include determining a first operational score associated with the system based on at least the obtained set of media characteristics and the obtained contextual information. The first operational score is indicative of operating conditions associated with the system for the communication of the media data over the network. The program instructions further include identifying a set of anomalies associated with the system based on a comparison of the first operational score with a threshold. The program instructions further include determining a set of operations to resolve the set of anomalies associated with the system. The program instructions further include executing the determined set of operations on the media data.

Various aspects of the disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment for identification and resolution of anomalies over a network, in accordance with an embodiment of the disclosure. With reference to FIG. 1, there is shown a computing environment 100 that contains an example of an environment for the execution of at least some of the computer code involved in performing the inventive methods, such as an identification and resolution of anomalies associated with anomaly identification and resolution code 120B. In addition to the identification and resolution of anomalies associated with anomaly identification and resolution code 120B, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the anomaly identification and resolution code 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or other wearable computer, a mainframe computer, a quantum computer, or any other form of a computer or a mobile device now known or to be developed in the future that is capable of running a program, accessing a network or querying a database, such as a remote database 108A. As is well understood in the art of computer technology, and depending upon the technology, the performance of a computer-implemented method may be distributed among multiple computers and/or between multiple locations. On the other hand, in this presentation of the computing environment 100, detailed discussion is focused on a single computer, specifically the computer 102, to keep the presentation as simple as possible. The computer 102 may be located in a cloud, even though it is not shown in a cloud in FIG. 1. On the other hand, computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in several types of computer-readable storage media, such as the cache 114B and the other storage media discussed below. The program instructions, and associated data, are accessed by the processor set 114 to control and direct the performance of the inventive methods. In computing environment 100, at least some of the instructions for performing the inventive methods may be stored in the dynamic modification of the identification and resolution of anomalies associated with the anomaly identification and resolution code 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 may be a read-only memory (ROM), but typically at least a portion of the persistent storage 120 allows writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the identification and resolution of anomalies associated with anomaly identification and resolution code 120B typically includes at least some of the computer code involved in performing the inventive methods.

The peripheral device set 122 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In some embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. For example, one sensor may be a thermometer and another sensor may be a motion detector.

The network module 124 is the collection of computer software, hardware, and firmware that allows computer 102 to communicate with other computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In other embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the inventive methods can typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In some embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through WAN 104 to EUD 106. In this way, the EUD 106 can display, or otherwise present recommendations to an end user. In some embodiments of the disclosure, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by other computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in other embodiments of the disclosure, a private cloud may be disconnected from the internet entirely and only accessible through a local/private network. A hybrid cloud is a composition of multiple clouds of diverse types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2:
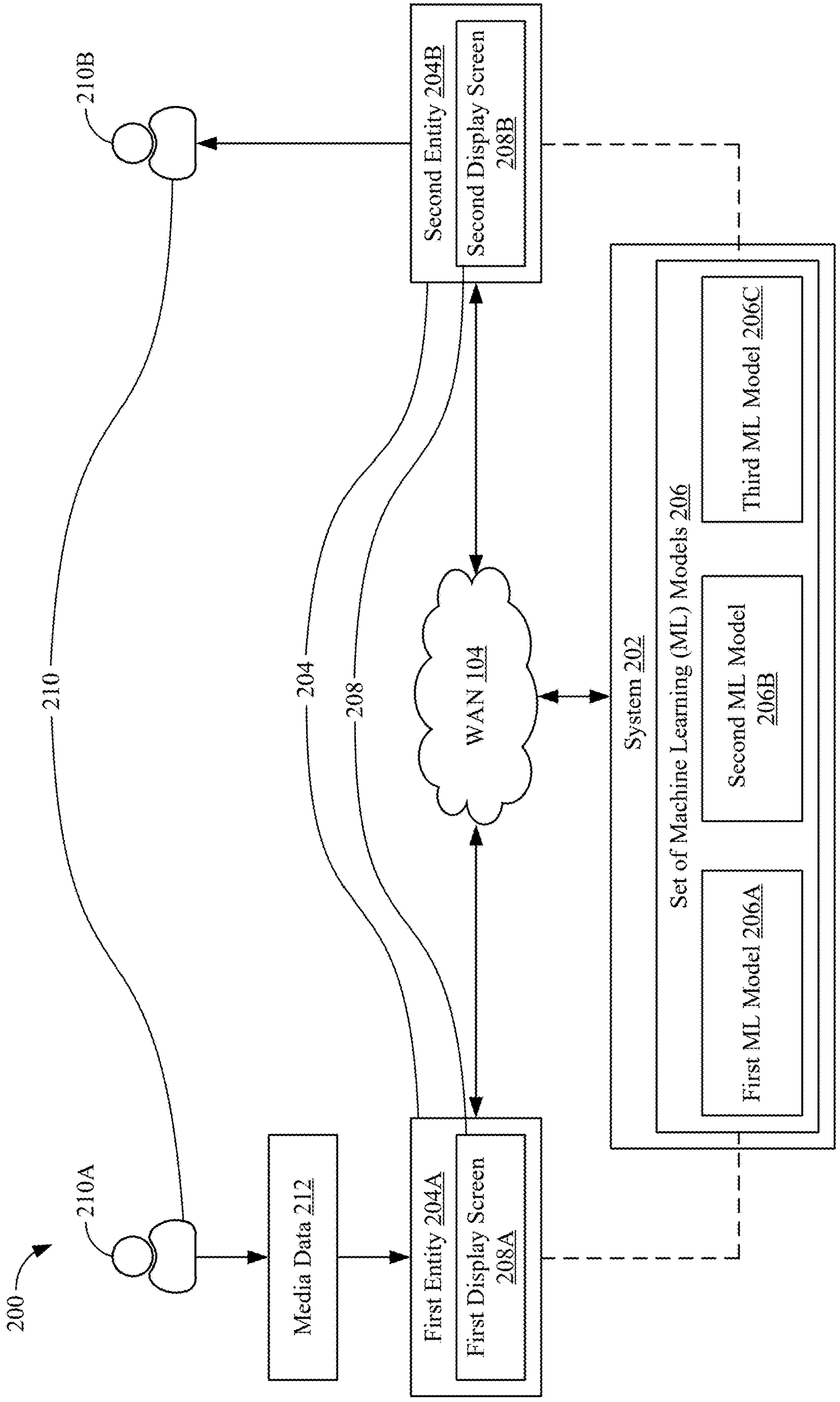
FIG. 2 is a diagram that illustrates an environment for identification and resolution of anomalies over the network, in accordance with an embodiment of the disclosure.

FIG. 2 is a diagram that illustrates an environment for identification and resolution of anomalies over the network, in accordance with an embodiment of the disclosure. FIG. 2 is explained in conjunction with elements from FIG. 1. With reference to FIG. 2, there is shown a diagram of a network environment 200. The network environment 200 includes a system 202, a plurality of entities 204, a set of machine learning (ML) models 206, and a WAN 104. In an embodiment of the disclosure, the WAN 104 may be an exemplary embodiment of the network. Each entity of the plurality of entities 204 is configured to communicate media data 212 via the system 202. The media data 212 may include, but is not limited to, texts, images, audio, videos, metadata (such as a file size, titles, description, and the like), graphic interchange formats (GIFs), interactive data (such as virtual reality data, augmented reality data, and the like), structured data (such as Extensible Markup Language (XML), JavaScript Object Notation (JSON), and the like. The plurality of entities 204 includes a first entity 204A and a second entity 204B. The plurality of entities 204 includes one or more display screens 208. For example, the first entity 204A includes a first display screen 208A, and the second entity 204B includes a second display screen 208B. Further, the plurality of entities 204 is associated with one or more participants 210. For example, the first entity 204A is associated with a first participant 210A of the one or more participants 210 and the second entity 204B is associated with a second participant 210B of the one or more participants 210. In an embodiment of the disclosure, at least one of the first participant 210A or the second participant 210B may communicate the media data 212 over the WAN 104. The set of ML models 206 includes a first ML model 206A, a second ML model 206B, and a third ML model 206C. In an embodiment of the disclosure, the first entity 204A and the second entity 204B may be an exemplary embodiment of the EUD 106. Similarly, the system 202 may be an exemplary embodiment of the computer 102 in FIG. 1.

The system 202 may include suitable logic, circuitry, interfaces, and/or code that may be configured for identification and resolution of anomalies associated with the first entity 204A. The system 202 may be configured to obtain at least a set of media characteristics associated with the media data 212 transmitted from the first entity 204A to the second entity 204B over the WAN 104 and contextual information associated with at least one of the first entity 204A or the second entity 204B. The system 202 may be further configured to determine a first operational score associated with the first entity 204A based on at least the obtained set of media characteristics and the obtained contextual information. The first operational score is indicative of operating conditions associated with the first entity 204A for the transmission of the media data 212 over the WAN 104. The system 202 may be further configured to identify a set of anomalies associated with the first entity 204A based on a comparison of the first operational score with a threshold. The system 202 may be further configured to determine a set of operations to resolve the set of anomalies associated with the first entity 204A. The system 202 may be further configured to control the first entity 204A to execute the determined set of operations on the media data 212.

The one or more display screens 208 may include suitable logic, circuitry, and interfaces that may be configured to render at least one of the identified set of anomalies associated with the first entity 204A or the determined set of operations. In an embodiment of the disclosure, the one or more display screens 208 may correspond to an external display device. In an embodiment of the disclosure, the first display screen 208A associated with the first entity 204A may be a touch screen which may enable the first entity 204A to render data associated with at least one of the identified set of anomalies associated with the first entity 204A. The touch screen may be at least one of a resistive touch screen, a capacitive touch screen, or a thermal touch screen. In an embodiment of the disclosure, the one or more display screens 208 may correspond to a display screen of a head-mounted device (HMD), a smart-glass device, a see-through display, a projection-based display, an electro-chromic display, or a transparent display. In an embodiment of the disclosure, the one or more display screens 208 may be realized through several known technologies such as, but not limited to, at least one of a Liquid Crystal Display (LCD) display, a Light Emitting Diode (LED) display, a plasma display, or an Organic LED (OLED) display technology, or other display devices.

The plurality of entities 204 may include suitable logic, circuitry, interfaces, and/or code that may be configured to communicate the media data 212 over the WAN 104. In an embodiment of the disclosure, the plurality of entities 204 may be configured to communicate the media data 212 to the system 202. In an embodiment of the disclosure, the first entity 204A may be configured to transmit the media data 212 to the second entity 204B over the WAN 104. In another embodiment of the disclosure, the first entity 204A may be configured to receive the media data 212 from the second entity 204B over the WAN 104. In an embodiment of the disclosure, the plurality of entities 204 may correspond to a stand-alone user or an organization. Examples of the plurality of entities 204 may include, but are not limited to, a computing device, a mainframe machine, a server, a computer work-station, a smartphone, a cellular phone, a mobile phone, a gaming device, a consumer electronic (CE) device, a head-mounted device, a virtual reality (VR) Headset, an augmented reality (AR) Device, a Mixed Reality (MR) Device, a projection-based System, and/or any other device with computer vision display capabilities.

Each ML model of the set of ML models 206 (such as the first ML model 206A, the second ML model 206B, and the third ML model 206C) may be a computational network or a system of artificial neurons, arranged in a plurality of layers, as nodes. The plurality of layers of each model of the set of ML models 206 may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of each ML model of the set of ML models 206. Outputs of each hidden layer may be coupled to inputs of at least one node in other layers of each ML model of the set of ML models 206. Node(s) in the final layer may receive inputs from at least one hidden layer to output a result. The number of layers and the number of nodes in each layer may be determined from hyper-parameters of each ML model of the set of ML models 206. Such hyper-parameters may be set before or while training each model of the set of ML models 206 on a training dataset.

Each node of each ML model of the set of ML models 206 may correspond to a mathematical function (e.g., a sigmoid function or a rectified linear unit) with a set of parameters, tunable during training of each ML model of the set of ML models 206. The set of parameters may include, for example, a weight parameter, a regularization parameter, and the like. Each node may use the mathematical function to compute an output based on one or more inputs from nodes in other layer(s) (e.g., previous layer(s)) of each ML model of the set of ML models 206. All or some of the nodes of each ML model of the set of ML models 206 may correspond to the same or a different mathematical function.

In training of each ML model of the set of ML models 206, one or more parameters of each node of each ML model of the set of ML models 206 may be updated based on whether an output of the final layer for a given input (from the training dataset) matches a correct result based on a loss function for each ML model of the set of ML models 206. The above process may be repeated for the same or a different input until a minima of loss function may be achieved, and a training error may be minimized. The training is performed using a training process, for example, gradient descent, stochastic gradient descent, batch gradient descent, gradient boost, meta-heuristics, and the like.

Each ML model of the set of ML models 206 may include electronic data, such as, for example, a software program, code of the software program, libraries, applications, scripts, or other logic or instructions for execution by a processing device, such as the processor set 114. Each ML model of the set of ML models 206 may include code and routines configured to enable a computing device, such as the system 202 to perform one or more operations. Additionally, or alternatively, each ML model of the set of ML models 206 may be implemented using hardware including a processor, a microprocessor (e.g., to perform or control performance of one or more operations), a field-programmable gate array (FPGA), or an application-specific integrated circuit (ASIC). Alternatively, in some embodiments, each ML model of the set of ML models 206 may be implemented using a combination of hardware and software. Although in FIG. 2, the set of ML models 206 is shown as an integrated entity associated with the system 202, the disclosure is not so limited. Accordingly, in some embodiments, the set of ML models 206 may be integrated within the plurality of entities 204, without deviation from scope of the disclosure. In an embodiment, the set of ML models 206 may be stored in at least one of the first entity 204A or the second entity 204B. Examples of the set of ML models 206 may include, but are not limited to, a deep neural network (DNN), a convolutional neural network (CNN), a CNN-recurrent neural network (CNN-RNN), an artificial neural network (ANN), a fully connected neural network, and/or a combination of such networks.

Each ML model of the set of ML models 206 may correspond to a computer-based system or software that exhibits characteristics commonly associated with human intelligence. Each ML model of the set of ML models 206 may be designed to perform tasks that typically require human intelligence, such as problem-solving, learning, reasoning, perception, understanding natural language, and decision-making. Each ML model of the set of ML models 206 may be a sophisticated piece of software that leverages natural language processing (NLP) and machine learning techniques to understand, generate, and manipulate human language.

In an embodiment of the disclosure, the first ML model 206A may be configured to encode the media data 212 to reduce the size of the media data 212 communicated between the first entity 204A and the second entity 204B. The reduction in the size of the media data 212 allows for an increase in the data upload speed associated with the transmission of the media data 212 at the first entity 204A. In an embodiment of the disclosure, the first ML model 206A may correspond to a speech-to-text model. Further, to encode the media data 212, the speech-to-text model may be trained to obtain audio data associated with the media data 212. The audio data includes the speech of the first participant 210A associated with the first entity 204A. The speech-to-text model may be trained to generate text data based on the audio data. The text data may include a text corresponding to the speech of the first participant 210A associated with the first entity 204A. Details about the implementation of the first ML model 206A for encoding of the media data 212 are provided for example, in FIG. 5A.

In another embodiment of the disclosure, the second ML model 206B may be configured to decode the encoded media data for the reception of the media data 212. In an embodiment of the disclosure, the decoding of the encoded media data may correspond to a generation of the media data 212 from the encoded media data. In an embodiment of the disclosure, the second ML model 206B may correspond to a text-to-speech model. Further, to decode the encoded media data, the text-to-speech model may be trained to generate natural audio data based on the text data. The natural audio data may include a second speech corresponding to the text included in the text data. Details about the implementation of the second ML model 206B for decoding of the encoded media data are provided, for example in FIG. 5A.

In an embodiment of the disclosure, the third ML model 206C may be configured to determine a conversation cue score for the one or more participants 210. The conversation cue score may be indicative of a comprehension of the media data 212 by the one or more participants 210. In an example embodiment of the disclosure, the third ML model 206C may correspond to a language model or a large language model (LLM) model that is specifically designed for tasks related to language understanding and generation on a large scale. Certain characteristics of the LLM model may include, but are not limited to, natural language understanding, text generation, semantic understanding, transfer learning, multimodal capabilities, continuous learning, and user interaction. In an example, the LLM model for language processing may be implemented using Generative Pre-Trained Transformers (GPT), Bidirectional Encoder Representations from Transformers (BERT), and the like.

The LLM is a type of ML model specifically designed to understand, generate, and manipulate human language on a large scale. LLMs leverage machine learning techniques, particularly those based on deep learning architectures, to process and comprehend natural language. LLMs have gained prominence for their ability to perform a wide range of language-related tasks, including natural language understanding, text generation, translation, summarization, and more. Typically, LLMs may be characterized by a vast number of parameters, often ranging from tens of millions to billions. The large parameter count allows these models to capture complex language patterns and relationships during training.

In an embodiment of the disclosure, the LLMs are built on Transformer architecture, however, this should not be construed as a limitation. For example, the Transformer architecture effectively captures long-range dependencies and contextual information in language. Moreover, the Transformer architecture may use attention mechanisms to weigh the significance of various parts of an input sequence. In addition, the LLMs may employ bidirectional processing, allowing the models to consider context from both directions when analyzing a sequence of words. This bidirectional approach enhances the model's understanding of the context in which words appear. In an example, the LLMs may generate contextual representations of words, meaning that the representation of a word is influenced by its surrounding context. This enables the model to capture the meaning of words in different contexts.

It may be noted, a base model in an LLM refers to a pre-trained model that has been trained on a large corpus of data for a general natural language understanding and generation task. The pre-trained model serves as a foundation for capturing broad linguistic patterns and knowledge from diverse sources. For example, in the context of pre-trained transformers, a base model is pre-trained on a massive dataset to predict the next word in a sequence, effectively learning grammar, context, and semantics from diverse language patterns. Details about the implementation of the third ML model 206C for determination of the conversation cue score are provided, for example, in FIG. 3.

In an embodiment of the disclosure, the set of ML models 206 may be implemented on the first entity 204A or the second entity 204B as a plurality of distributed cloud-based resources by use of several technologies that are well known to those ordinarily skilled in the art. A person with ordinary skill in the art will understand that the scope of the disclosure may not be limited to the implementation of the set of ML models 206 on the plurality of entities 204. In an embodiment of the disclosure, the first ML model 206A may be implemented on at least one of the first entity 204A or the second entity 204B. In another embodiment of the disclosure, the second ML model 206B may be implemented on at least one of the first entity 204A or the second entity 204B. In yet another embodiment of the disclosure, the third ML model 206C may be implemented on at least one of the first entity 204A or the second entity 204B.

In operation, the media data 212 are being transmitted from the first entity 204A associated with the first participant 210A to the second entity 204B associated with the second participant 210B. Further, the set of anomalies associated with the first entity 204A may occur during the transmission of the media data 212 to the second entity 204B, leading to the distortions in the audio included in the media data 212 or the decrease in the resolution of the video included in the media data 212. Further, due to the distortions in the audio or the decrease in the resolution of the video, the second participant 210B associated with the second entity 204B may be unable to comprehend the media data 212 transmitted by the first participant 210A. Hence, to provide efficient communication between the first participant 210A and the second participant 210B, the system 202 may be configured to identify the set of anomalies associated with the first entity 204A and determine the set of operations required to be performed to resolve the identified set of anomalies associated with the first entity 204A. Accordingly, a flowchart is provided with reference to FIG. 3.

Figure 3:
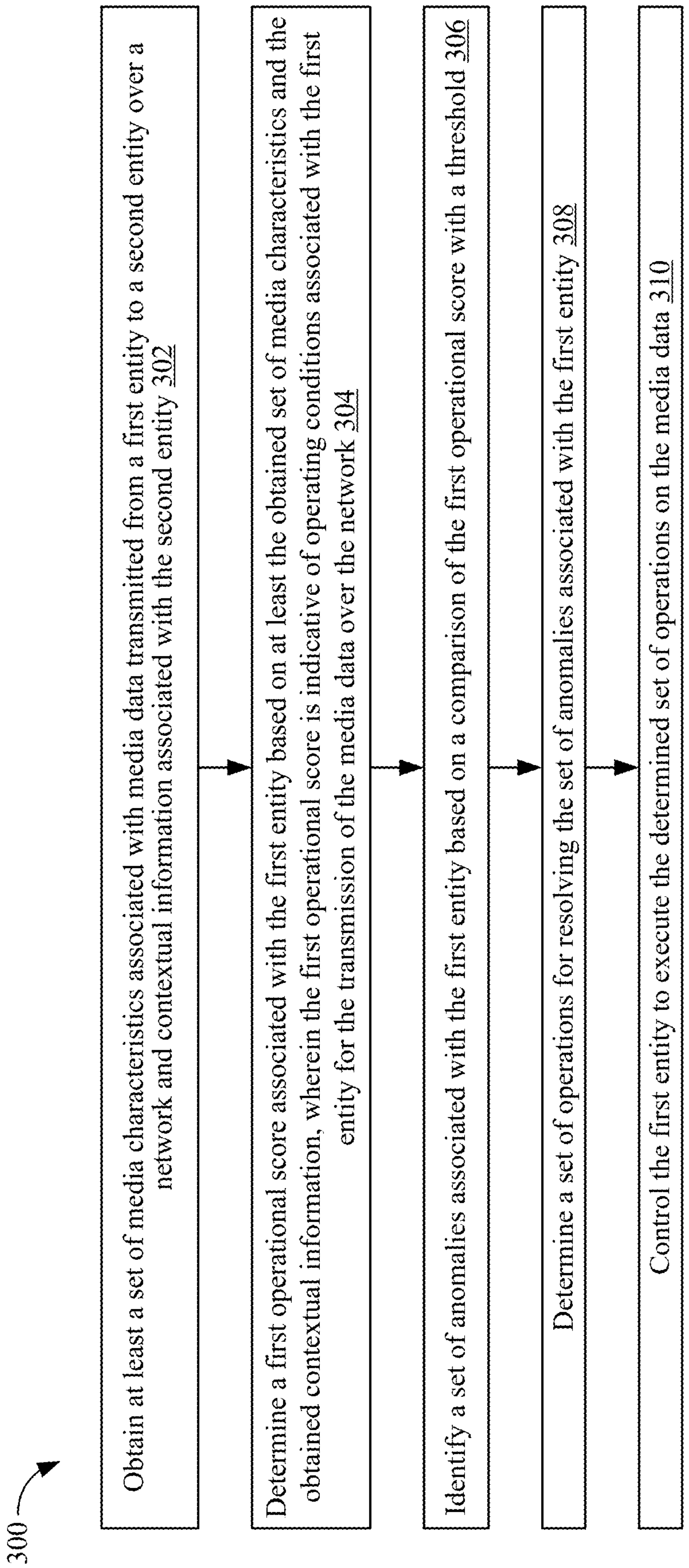
FIG. 3 is a flowchart of a method for identification and resolution of anomalies associated with transmission of media data over the network, in accordance with an embodiment of the disclosure.

FIG. 3 is a flowchart of a method for identification and resolution of anomalies associated with the transmission of the media data 212 over the network, in accordance with an embodiment of the disclosure. FIG. 3 is explained in conjunction with elements from FIG. 1, and FIG. 2. With reference to FIG. 3, there is shown a flowchart 300. The operations of the method depicted by the flowchart 300 may be executed by any computing system, for example, by the computer 102 of FIG. 1 or the system 202 of FIG. 2. The operations of the flowchart 300 may start at 302.

At 302, at least one of the set of media characteristics associated with the media data 212 transmitted from the first entity 204A to the second entity 204B over the WAN 104 and the contextual information associated with at least one of the first entity 204A or the second entity 204B are obtained.

In an embodiment of the disclosure, the set of media characteristics includes at least one of a type of the media data 212, a resolution of the media data 212, a duration of media associated with the media data 212, timestamp data of the media associated with the media data 212, first bandwidth data associated with the transmission of the media data 212 from the first entity 204A, second bandwidth data associated with reception of the media data 212 at the second entity 204B, a rate of packet loss associated with the communication of the media data 212, or an encryption state of the media data 212. The set of media characteristics is explained in detail in FIG. 4.

In an embodiment of the disclosure, the contextual information includes context cue information. The context cue information may be indicative of a comprehension of at least a first portion of the media data 212 by a second participant 210B associated with the second entity 204B. In an embodiment of the disclosure, the context cue information includes one or more first texts indicative of an inability of the second participant 210B to comprehend at least the first portion of the media data 212. By the way of example and not limitation, the one or more first texts may correspond to "I can't hear you right now," or "I'm sorry you're cutting out." The contextual information is described in detail in FIG. 4.

At 304, the first operational score associated with the first entity 204A is determined based on the obtained set of media characteristics and the obtained contextual information. The first operational score is indicative of operating conditions associated with the first entity 204A for the transmission of the media data 212 over the WAN 104. The first operational score may be indicative of a performance metric score corresponding to a performance of the first entity 204A for the transmission of the media data 212. In an embodiment of the disclosure, the first performance score is a numerical value (such as 10, 50, 0.4, and 0.09). In another embodiment of the disclosure, the first performance score is a percentage (such as 10%, 50%, and 85%). In an embodiment of the disclosure, the first operational score may correspond to one or a combination of the data upload speed, a first audio comprehensibility score, a first entity performance score, and a first conversation cue score. The first operational score associated with the first entity 204A is described in detail in FIG. 4.

At 306, the set of anomalies associated with the first entity 204A is identified based on a comparison of the first operational score with a threshold. In an embodiment of the disclosure, the set of anomalies includes a decrease in a bandwidth associated with the first entity 204A, an increase in a packet loss associated with the communicated media data 212, an increase in traffic over the WAN 104, and a fault event associated with the first entity 204A (such as hardware failure). Details about the identification of the set of anomalies are provided, for example, in FIG. 4.

At 308, the set of operations is determined to resolve the set of anomalies associated with the first entity 204A. In an embodiment of the disclosure, the set of operations includes at least one of an encoding operation, a decoding operation, a backup operation, a session re-initiation operation, a bandwidth throttling operation, a rate limiting operation, or a load balancing operation. The set of operations is described in detail in FIG. 4.

At 310, the first entity 204A is controlled to execute the determined set of operations on the media data 212. In an example embodiment of the disclosure, to execute the encoding operation, the first entity 204A is controlled to apply the first ML model 206A on the media data 212. Details about the execution of the determined set of operations are provided, for example, in FIG. 5A and FIG. 5B.

Figure 4:
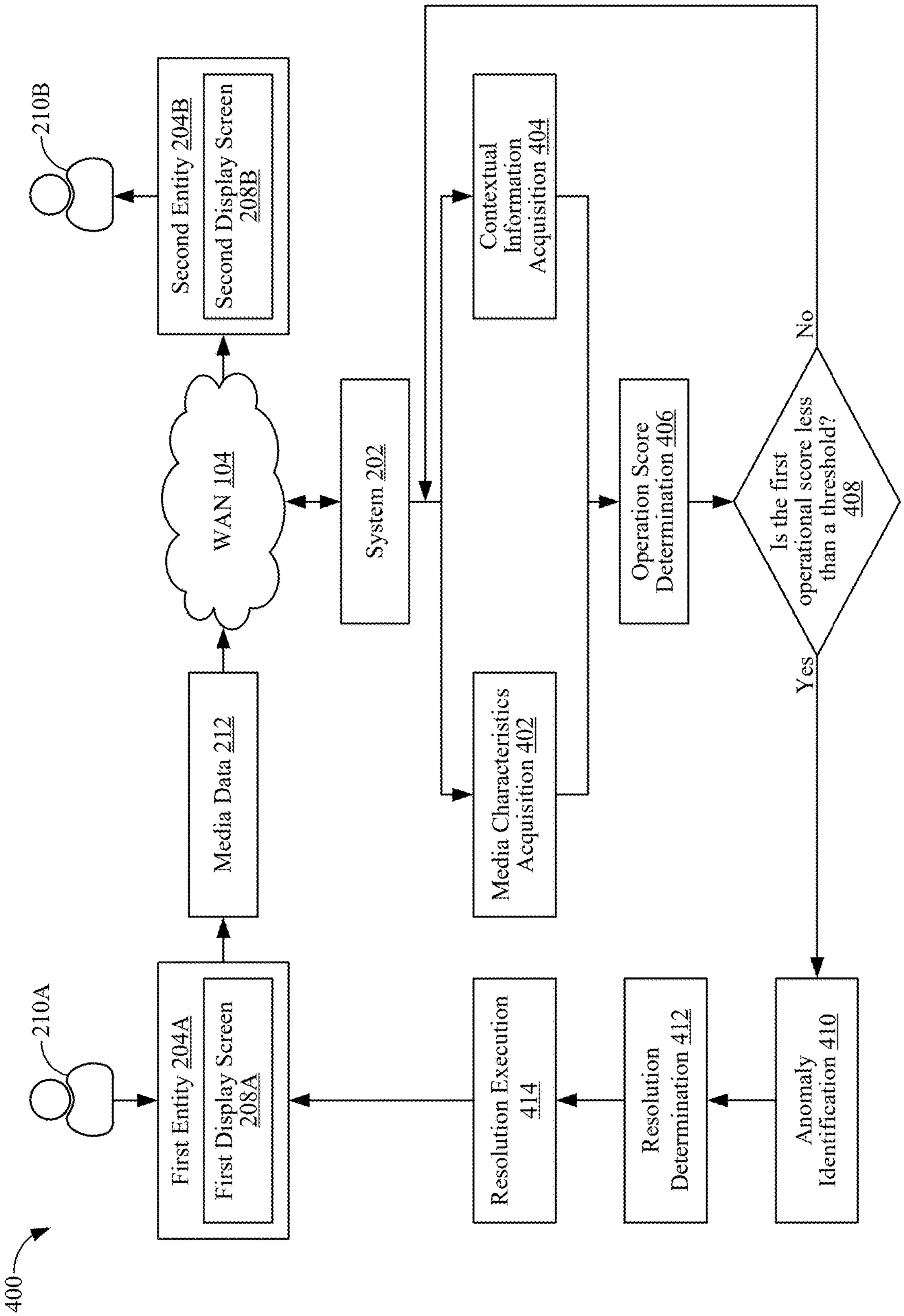
FIG. 4 is a diagram that illustrates exemplary operations for identification and resolution of anomalies associated with the transmission of the media data over the network, in accordance with an embodiment of the disclosure.

FIG. 4 is a diagram that illustrates exemplary operations for identification and resolution of anomalies associated with the transmission of the media data 212 over the network, in accordance with an embodiment of the disclosure. FIG. 4 is explained in conjunction with elements from FIG. 1, FIG. 2, and FIG. 3. With reference to FIG. 4, there is shown a block diagram 400 that illustrates exemplary operations from 402 to 414, as described herein. The exemplary operations illustrated in the block diagram 400 may start at 402 and may be performed by any computing system, apparatus, or device, such as by the computer 102 of FIG. 1 or system 202 of FIG. 2. Although illustrated with discrete blocks, the exemplary operations associated with one or more blocks of the block diagram 400 may be divided into additional blocks, combined into fewer blocks, or eliminated, depending on the particular implementation.

At 402, a media characteristics acquisition operation is executed. In the media characteristics acquisition operation, the system 202 may be configured to obtain the set of media characteristics associated with media data 212 transmitted from the first entity 204A to the second entity 204B over the WAN 104. The set of media characteristics includes at least one of the type of the media data 212, the resolution of the media data 212, the duration of media associated with the media data 212, the timestamp data of the media associated with the media data 212, the first bandwidth data associated with the transmission of the media data 212 from the first entity 204A, the second bandwidth data associated with the reception of the media data 212 at the second entity 204B, the rate of packet loss associated with the communication of the media data 212, or the encryption state of the media data 212.

In an embodiment of the disclosure, the type of the media data 212 may correspond to one or a combination of a text type, an audio type, a video type, an image type, a metadata type, an interactive data type, a GIF type, a structured data type, or a combination thereof. In an embodiment of the disclosure, the resolution of the media data 212 may be indicative of a quality of the media data 212. The resolution of the media data 212 may be measured as a number of pixels rendered on the first display screen 208A. Additionally or alternatively, the number of pixels may be defined in terms of the width of the first display screen 208A and a height of the first display screen 208A. In an example embodiment of the disclosure, the resolution of the media data 212 may correspond to 640×480 pixels, 720×576 pixels, or 1920×1080 pixels. In an embodiment of the disclosure, the duration of media associated with the media data 212 is indicative of a total output time for the media. In an example embodiment of the disclosure, a duration of the video included in the media data 212 may correspond to a total display time of the video. The total display time can be measured in seconds, minutes, or hours. In an embodiment of the disclosure, the timestamp data of the media associated with the media data 212 may include temporal information associated the at least a first portion of the media data 212. The temporal information may be indicative of a point of time with respect to the total output time. Additionally, the temporal information may be defined in terms of hours, minutes, and seconds. In an example embodiment of the disclosure, a timestamp of the video within the media data 212 may correspond to "01:23:32". In an embodiment of the disclosure, the first bandwidth data may be indicative of a first bandwidth at the first entity 204A for the transmission of the media data 212. In an embodiment of the disclosure, the second bandwidth data may be indicative of a second bandwidth at the second entity 204B for the reception of the media data 212. In an embodiment of the disclosure, the rate of packet loss may correspond to a number of packets lost during the communication of the media data 212 between the first entity 204A and the second entity 204B. In an embodiment of the disclosure, the encryption state may be indicative of a presence of an encryption on the media data 212 or an absence of the encryption on the media data 212.

At 404, a contextual information acquisition operation is executed. In the contextual information acquisition operation, the system 202 may be configured to obtain the contextual information associated with at least one of the first entity 204A or the second entity 204B. In an embodiment of the disclosure, the contextual information includes context cue information. The context cue information may be indicative of the comprehension of at least the first portion of the media data 212 by the second participant 210B associated with the second entity 204B. Specifically, the context cue information may indicate whether the second participant 210B associated with the second entity 204B is able to comprehend at least the first portion of the media data 212 or not.

In an embodiment of the disclosure, the context cue information includes the one or more first texts indicative of the inability of the second participant 210B to comprehend at least the first portion of the media data 212. By the way of example and not limitation, the one or more first texts may correspond to "I can't hear you right now," or "I'm sorry you're cutting out." In an embodiment of the disclosure, the system 202 may be configured to control the second entity 204B to obtain the contextual information. Specifically, the system 202 may be configured to control the second entity 204B to obtain the contextual information in response to reception of the media data 212 at the second entity 204B.

In another embodiment of the disclosure, the context cue information includes one or more second texts indicative of a perception of the first participant 210A on the inability of the second participant 210B to comprehend at least the first portion of the media data 212. By the way of example and not limitation, the one or more second texts may correspond to "Can you hear me?" or "Am I audible?" In another embodiment of the disclosure, the system 202 may be configured to control the first entity 204A to obtain the contextual information. Specifically, the system 202 may be configured to control the first entity 204A to obtain the contextual information in response to transmission of the media data 212 from the first entity 204A.

In an embodiment of the present disclosure, the system 202 may be configured to obtain entity information associated with at least one of the first entity 204A and the second entity 204B. Based on at least one of the set of media characteristics, the contextual information, or the entity information, the system 202 may be configured to select the first entity 204A for identification of the set of anomalies. The entity information includes at least one of entity type information, entity identifier information, entity network information, entity location information, entity participant data, entity resource information, or the entity status information. In an embodiment of the disclosure, the system 202 may be configured to obtain the entity information from a database associated with at least one of the first entity 204A or the second entity 204B. In another embodiment, the system 202 may be configured to update the entity information based on a determination that at least one of a first hardware associated with the first entity 204A or a second hardware associated with the second entity 204B is modified.

In an embodiment of the disclosure, the entity type information may include a type of at least one of the first entity 204A or the second entity 204B. In an example embodiment of the disclosure, a first type of the first entity 204A corresponds to the mobile device, and a second type of the second entity 204B corresponds to the computing device. In an embodiment of the disclosure, the entity identifier information may include at least a respective identifier for the first entity 204A and the second entity 204B. The respective identifier may include, but is not limited to, a media access control (MAC) address, a universally unique identifier (UUI), and an international mobile equipment identity (IMEI). In an embodiment of the disclosure, the entity network information may include at least a type of the network. The type of the network may include, but are not limited to, a Wireless fidelity (Wi-Fi), an Ethernet, a Long-term Evolution (LTE), and the WAN 104. The entity location information may include a location of at least the first entity 204A or the second entity 204B. The entity participant may include participant information for at least one of the first participant 210A or the second participant 210B. The participant information may include at least one participant name, a participant identifier, and a participant role at a point in time corresponding to the communication of the media data 212. The participant role may correspond to at least one of a sender or a receiver. The entity resource information may be indicative of a resource associated with at least one of the first entity 204A or the second entity 204B. In an example embodiment of the disclosure, the resource may correspond to at least one of a storage resource (such as a total storage capacity, a storage type), a computing resource (a number of processing cores, a clock speed, a type of Graphical Processing Unit (GPU). In an embodiment of the disclosure, the entity status information may be indicative of an operational status for at least one of the first entity 204A, or the second entity 204B. In an example embodiment of the disclosure, the operational status may correspond to at least one of an active, an idle state, or an inactive state.

At 406, an operational score determination operation is executed. In the operational score determination operation, the system 202 may be configured to determine the first operational score associated with the first entity 204A based on the obtained set of media characteristics and the obtained contextual information. The first operational score is indicative of the operating conditions associated with the first entity 204A for the transmission of the media data 212 over the WAN 104. In an embodiment of the disclosure, the first operational score associated with first entity 204A may be indicative of the performance metric score corresponding to the performance of the first entity 204A for the transmission of the media data 212. In an embodiment of the disclosure, the first operational score may correspond to one or a combination of the data upload speed, the first audio comprehensibility score, the first entity performance score, and the first conversation cue score.

In an embodiment of the disclosure, the data upload score may be indicative of a speed of the transmission of the media data 212 from the first entity 204A. In an embodiment of the disclosure, the system 202 may be configured to determine the data upload score based on the set of media characteristics.

In an embodiment of the disclosure, the first audio comprehensibility score may be indicative of a quality of the audio included in the media data 212. In an embodiment of the disclosure, the system 202 may be configured to determine the first audio comprehensibility score based on an application of the first ML model 206A on the media data 212. As described in the FIG. 2, the first ML model 206A may correspond to the speech-to-text model. The speech-to-text model is trained to determine the first audio comprehensibility score based on the generation of the text data from the audio data included in the media data 212. Details about the implementation of the first ML model 206A for the generation of the text data are provided, for example, in FIG. 5A.

In an embodiment of the disclosure, the first entity performance score may be indicative of a performance of a hardware associated with the first entity 204A for the transmission of the media data 212. In an embodiment of the disclosure, the system 202 may configured to determine the first entity performance score based on the entity information associated with the first entity 204A. In an embodiment of the disclosure, the system 202 may be configured to determine, using the third ML model 206C, the first conversation cue score based on the one or more first texts. The first conversation cue score is indicative of the inability of the second participant 210B to comprehend the media data 212 transmitted from the first entity 204A. In another embodiment of the disclosure, the system 202 may be configured to determine, using the third ML model 206C, a second conversation cue score based on the one or more second texts. The second conversation cue score is indicative of the perception of the first participant 210A on the inability of the second participant 210B to comprehend the media data 212 transmitted from the first entity 204A.

In an example embodiment of the disclosure, the system 202 may be configured to determine the first operational score based on the data upload score, the first audio comprehensibility score, and the first conversation cue score. In an embodiment of the disclosure, the system 202 may be configured to determine a marginal score based on a subtraction of the first conversation cue score from the first audio comprehensibility score. Further, the system 202 may be further configured to determine the first operational score based on an addition of the marginal score and the data upload score.

At 408, a determination is made whether the first operational score associated with the first entity 204A is less than the threshold or not. If the first operational score associated with the first entity 204A is less than the threshold, the operation may continue at 412 based on the determined first operational score. Otherwise, the operation may continue at 402 to monitor the WAN 104 for identification and resolution of anomalies associated with the first entity 204A.

Specifically, and by way of an example, the first operational score may correspond to a combination of the data upload score denoted by X, the first audio comprehensibility score denoted by Y, the first conversation cue score denoted by Z. Further, the first operational score associated with the first entity 204A may be defined as $X+Y-Z$. Thereafter, the system 202 may be configured to compare the first operational score defined as $X+Y-Z$ with the threshold denoted by T1. If the first operational score is less than the threshold given as $X+Y-Z<T1$, then the operation may continue at 410 based on the determined first operational score. Otherwise, the operation may continue at 402 to monitor the WAN 104 for identification and resolution of anomalies associated with the first entity 204A.

In an embodiment of the disclosure, the first operational score may correspond to the data upload score and the threshold may correspond to a data upload score threshold. The system 202 may be configured to compare the data upload score with a data upload score threshold. If the data upload score is less than the data upload score threshold, the operation may continue at 412 based on the determined data upload score. Otherwise, the operation may continue at 410 to monitor the WAN 104 for identification and resolution of anomalies associated with the first entity 204A.

In another embodiment of the disclosure, the first operational score may correspond to the first audio comprehensibility score and the threshold may correspond to a first comprehensibility score threshold. The system 202 may be configured to compare the first audio comprehensibility score with the first comprehensibility score threshold. In an embodiment of the disclosure, the first audio comprehensibility score threshold may correspond to a percentage (such as 85%, 90%, and the like). If the first audio comprehensibility score associated with the first entity 204A is less than the first audio comprehensibility threshold, the operation may continue at 410 based on the audio comprehensibility score. Otherwise, the operation may continue at 402 to monitor the WAN 104 for identification and resolution of anomalies associated with the first entity 204A.

In an embodiment of the disclosure, the first operational score may correspond to the first entity performance score and the threshold may correspond to a first entity performance score threshold. The system 202 may be configured to compare the first entity performance score with the first entity performance score threshold. If the first entity performance score is less than the first entity performance score threshold, then the operation may continue at 410 based on the first entity performance score. Otherwise, the operation may continue at 402 to monitor the WAN 104 for identification and resolution of anomalies associated with the first entity 204A.

At 410, an anomaly identification operation may be executed. In the anomaly identification operation, based on the determination that the first performance score is less than the threshold, the system 202 may be configured to identify the set of anomalies associated with the first entity 204A. The set of anomalies may include, but are not limited to, the decrease in the bandwidth associated with the first entity 204A, the increase in a packet loss associated with the communicated media data 212, the increase in traffic over the WAN 104, and the fault event associated with the first entity 204A (such as hardware failure).

In an example embodiment of the disclosure, based on the determination that the first performance score is less than the threshold, the system 202 may identify the decrease in the bandwidth associated with the first entity 204A. Further, the decrease in the bandwidth associated with the first entity 204A may lead to distortions in the audio included in the media data 212. Further, due to the distortions in the audio included in the media data 212, the second participant 210B may be unable to comprehend the media data 212 transmitted by the first participant 210A associated with the first entity 204A.

At 412, a resolution determination operation is executed. In the resolution determination operation, the system 202 may be configured to determine the set of operations for resolving the set of anomalies associated with the first entity 204A. The set of operations for resolving the set of anomalies includes at least one of the encoding operations, the decoding operation, the backup operation, the session re-initiation operation, the bandwidth throttling operation, the rate limiting operation, or the load balancing operation.

In an embodiment of the disclosure, to execute the encoding operation, the system 202 may be configured to encode the media data 212 to generate encoded media data. The size of the encoded media data is less than the size of the media data 212. In an example embodiment of the disclosure, the system 202 may determine the encoding operation to resolve aforementioned challenge associated with the comprehension of the media data 212 by the second participant 210B associated with the second entity 204B. Details about the encoding operation are provided for example, in FIG. 5A, and FIG. 5B. In an embodiment of the disclosure, to execute the decoding operation, the system 202 may be configured to decode the encoded media data. The decoding operation may correspond to a re-generation of the media data 212 from the encoded media data. Details about the decoding operation are provided, for example, in FIG. 5A, and FIG. 5B. In an embodiment of the disclosure, to execute the backup operation, the system 202 may be configured to duplicate the media data 212. The system 202 may be further configured to store the duplicated media data in the system 202, or an instance of the system 202 (such as the persistent storage 120, remote server 108). In an embodiment of the disclosure, to execute the session re-initiation operation, the system 202 may be configured to re-initiate a current communication session between the first entity 204A and the second entity 204B. In an embodiment of the disclosure, to execute the bandwidth throttling operation, the system 202 may be configured to a decrease an amount of the media data 212 transmitted from the first entity 204A to the second entity 204B corresponding to a first rate limit. In an embodiment of the disclosure, to execute the load balancing operation, the system 202 may be configured to limit a number of requests associated with the second entity 204B to obtain the media data 212. In an embodiment of the disclosure, to execute the load balancing operation, the system 202 may be configured to transmit the media data 212 over a plurality of distributed resources (such as distributed servers, and cloud storage databases).

At 414, a resolution execution operation is executed. In the resolution execution operation, the system 202 may be configured to control the first entity 204A to execute the determined set of operations on the media data 212. In an embodiment of the disclosure, the system 202 may be configured to determine a set of performance scores based on each operation of the set of operations. The system 202 may be further configured to select a first operation of the set of operations, such that a performance score of the first operation is highest among the set of performance scores. Further, the system 202 may be configured to control the first entity 204A to execute the selected first operation of the set of operations on the media data 212 to resolve the set of anomalies associated with the first entity 204A.

In an example embodiment of the disclosure, the system 202 may be configured to control the first entity 204A to execute the encoding operation. The execution of the encoding operation may reduce the size of the media data 212, leading to the increase in the transmission speed of the media data 212 at the first entity 204A. Accordingly, a diagram is provided with reference to FIG. 5A.

Figure 5A:
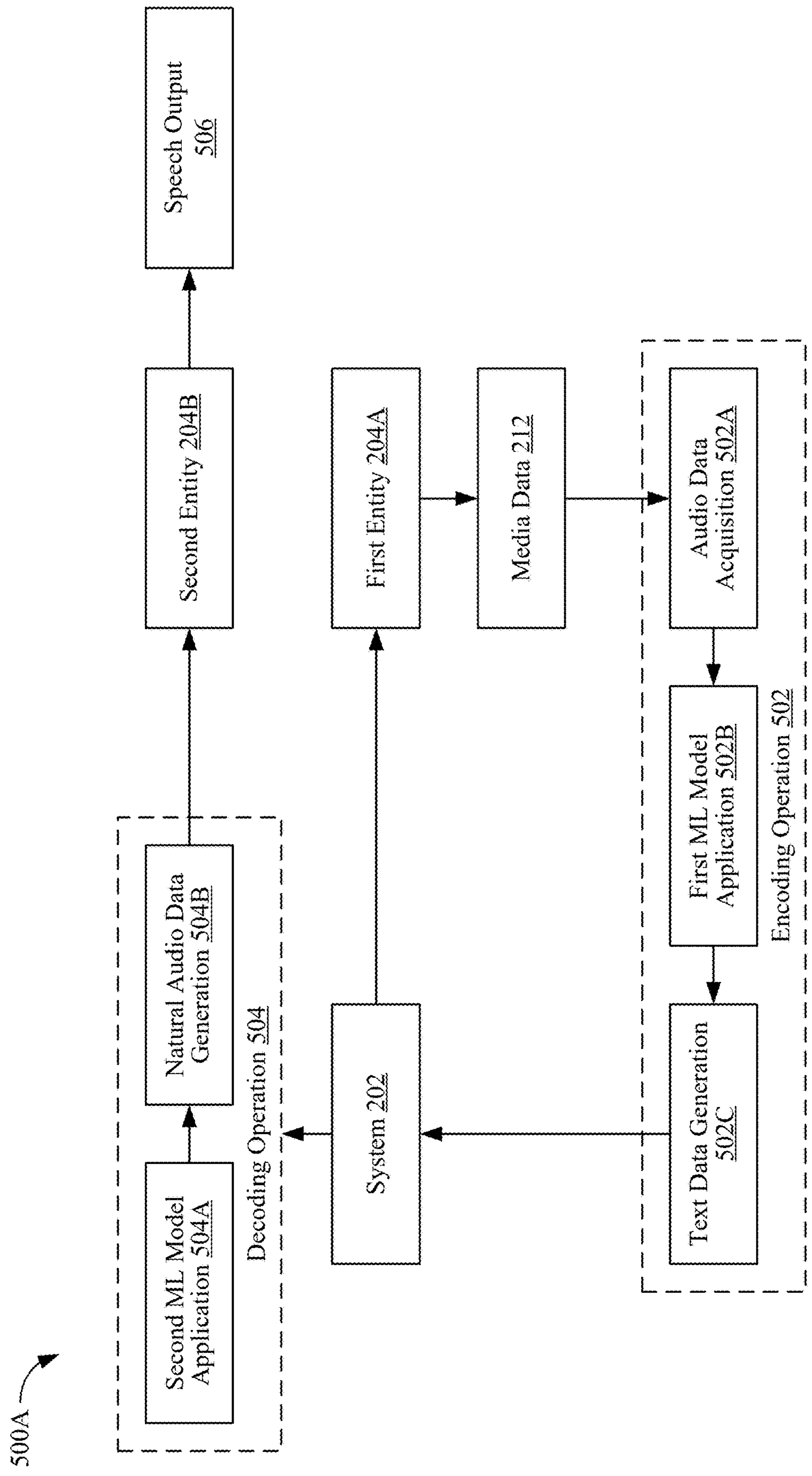
FIG. 5A is a diagram that illustrates exemplary operations to resolve a set of anomalies associated with the transmission of the media data over the network, in accordance with an embodiment of the disclosure.

FIG. 5A is a diagram that illustrates exemplary operations to resolve the set of anomalies associated with the transmission of the media data over the network, in accordance with an embodiment of the disclosure. FIG. 5A is explained in conjunction with elements from FIG. 1, FIG. 2, FIG. 3, and FIG. 4. With reference to FIG. 5A, there is shown a block diagram 500A that illustrates exemplary operations from 502 to 506, as described herein. The first exemplary operations illustrated in the block diagram 500A may start at 502 and may be performed by any computing system, apparatus, or device, such as by the computer 102 of FIG. 1 or system 202 of FIG. 2. Although illustrated with discrete blocks, the first exemplary operations associated with one or more blocks of the block diagram 500A may be divided into additional blocks, combined into fewer blocks, or eliminated, depending on the particular implementation.

At 502, an encoding operation is executed. In the encoding operation, the system 202 may be configured to control the first entity 204A to encode the media data 212. The encoding operation may include an audio data acquisition operation, a first ML model application operation, and a text data generation operation.

At 502A, the audio data acquisition operation is executed. In the audio data acquisition operation, the system 202 may be configured to control the first entity 204A to obtain the audio data associated with the media data 212. The audio data may include at least the first speech of the first participant 210A associated with the first entity 204A.

At 502B, the first ML model application operation is executed. In the first ML model application operation, the system 202 may be configured to control the first entity to apply the first ML model 206A of the set of ML models 206 on the obtained audio data. In an embodiment of the disclosure, the system 202 may be configured to control the first entity 204A to input the obtained audio data to the first ML model 206A. As described in FIG. 2, the first ML model 206A may correspond to the speech-to-text model. In an embodiment of the disclosure, the first ML model 206A may include a first encoder, and a first decoder. The first encoder may be configured to process the audio data to obtain a set of audio features. The set of audio features includes, but is not limited to, an amplitude of the first speech of the first participant 210A, a sequence of Fourier transforms of first speech of the first participant 210A, a spectrogram of frequencies associated with the first speech of the first participant 210A. The first encoder may further include recurrent or transformer layers. The recurrent or transformer layers may be configured to process the set of audio features to generate an encoded representation. The first decoder may be configured to generate a first output based on the encoded representation. The first output may include a text corresponding to the encoded representation. The Details about the training of the first ML model 206A are provided for example, in FIG. 11A.

At 502C, the text data generation operation is executed. In the text data generation operation, the system 202 may be configured to control the first entity 204A to generate the text data. In an embodiment of the disclosure, the system 202 may be configured to control the first entity to obtain the first output of the speech-to-text model. The system 202 may be further configured to generate the text data based on the obtained first output of the speech-to-text model. The text data may include at least a text corresponding to the first speech of the first participant 210A associated with the first entity 204A. The text data further includes a set of speech characteristics associated with the first speech of the first participant 210A. The set of speech characteristics includes at least one of a tone of the first speech, a pitch of the first speech, a rate of the first speech, an intensity of the first speech, a total number of words in the first speech, an accent in the first speech, or a pattern of pauses in the first speech. Additionally, the size of the generated text data is less than the size of the obtained audio data. The system 202 may be further configured to control the first entity 204A to obtain the generated text data. In an embodiment of the disclosure, based on the generated text data, the system 202 may be configured to execute the decoding operation to decode the generated text data.

At 504, the decoding operation is executed. In the decoding operation, the system 202 may be configured to decode the encoded media data. The decoding operation may include a second ML application model, and a natural audio data generation operation.

At 504A, the second ML model application operation is executed. In the second ML application operation, the system 202 may be configured to apply the second ML model 206B of the set of ML models 206 on the generated text data. In an embodiment of the disclosure, the system 202 may be configured to input the generated text data to the second ML model 206B. As described in FIG. 2, the second ML model 206B may correspond to the text-to-speech model. The text-to-speech model may include a second encoder and a second decoder. The second encoder may be configured to process the generated text data to obtain a set of linguistic features. The set of linguistics features may include, but are not limited to, phonemes, pitch variations, stress patterns, intonations, and phrasing. The second decoder may include second recurrent or second transformer layers. The second recurrent or second transformer layers may be configured to generate a second output based on the set of linguistic features. The second output may include at least a speech waveform corresponding to the text included in the text data. Details about the training of the second ML model 206B are provided, for example, in FIG. 11B.

At 504B, the natural audio data generation operation is executed. In the natural audio data generation operation, the system 202 may be configured to generate natural audio based on the generated text data. The natural audio data includes at least the second speech corresponding to the text included in the generated text data. In an embodiment of the disclosure, the system 202 may be configured to generate the natural audio data based on the second output of the second ML model 206B. In an embodiment of the disclosure, the system 202 may be configured to transmit the generated natural audio data to the second entity 204B.

At 506, a speech output operation is executed. In the speech output operation, the system may be configured to control the second entity 204B to output at least the second speech corresponding to the text included in the generated text data. In an embodiment of the disclosure, the system 202 may be configured to control the second entity 204B to generate an audio output indicative of at least the second speech corresponding to the text included in the generated text data. In another embodiment of the disclosure, the system 202 may be configured to control the second entity 204B to render a text corresponding to the at least the second speech on the second display screen 208B associated with the second entity 204B.

In an embodiment of the disclosure, based on the first operational score, the system 202 may be configured to control the first entity 204A, and the second entity 204B to execute the determined set of operations. In an example embodiment of the disclosure, the system 202 may be configured to control the first entity 204A to execute the encoding operation. Further, the system 202 may be configured to control the second entity 204B to execute the decoding operation. Accordingly, a diagram is provided with reference to FIG. 5B.

Figure 5B:
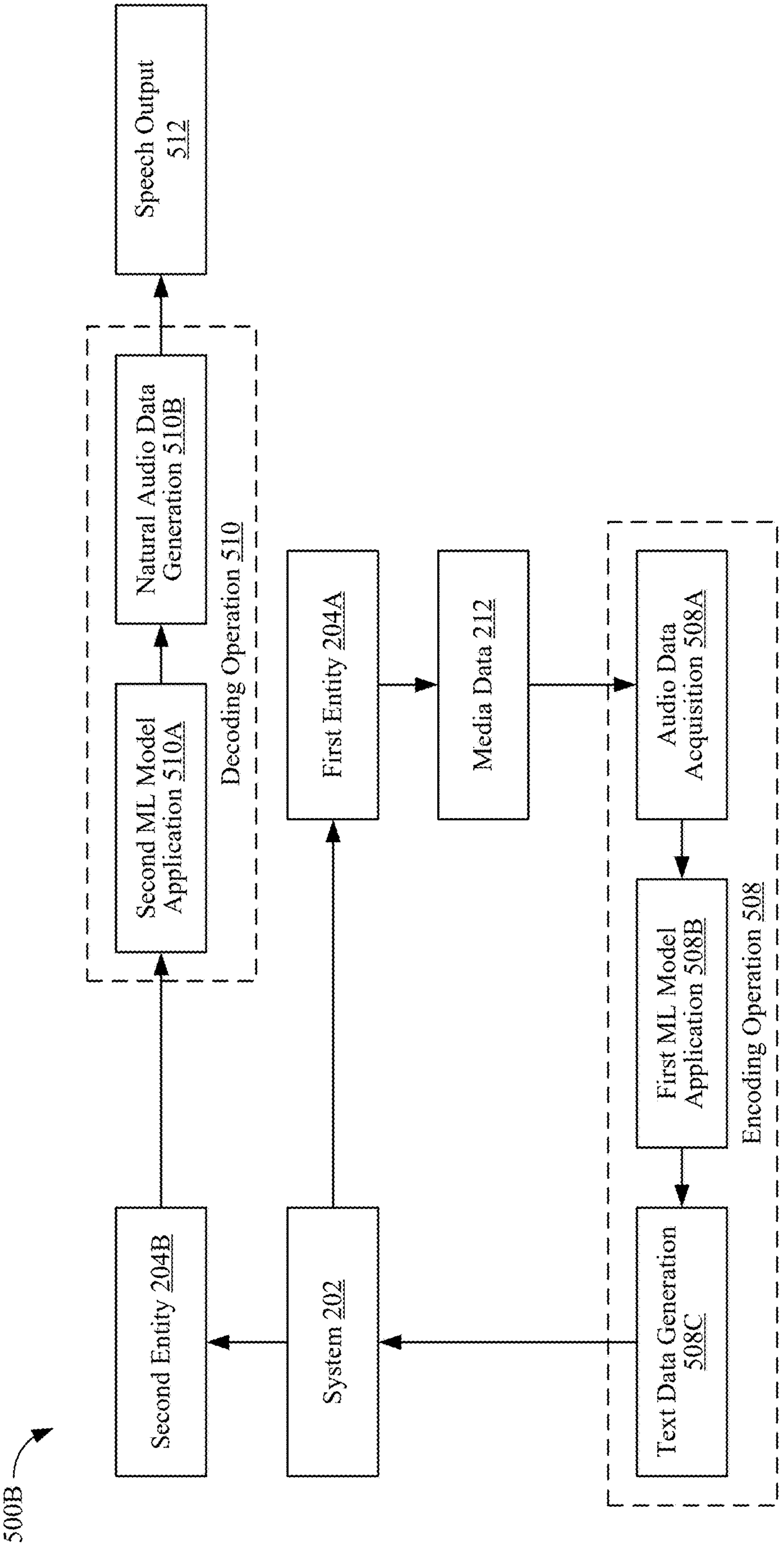
FIG. 5B is a diagram that illustrates other exemplary operations to resolve the set of anomalies associated with the transmission of the media data over the network, in accordance with an embodiment of the disclosure.

FIG. 5B is a diagram that illustrates other exemplary operations to resolve the set of anomalies associated with the transmission of the media data over the network, in accordance with an embodiment of the disclosure. FIG. 5B is explained in conjunction with elements from FIG. 1, FIG. 2, FIG. 3, FIG. 4, and FIG. 5A. With reference to FIG. 5B, there is shown a block diagram 500B that illustrates other exemplary operations from 508 to 512, as described herein. The other exemplary operations illustrated in the block diagram 500B may start at 508 and may be performed by any computing system, apparatus, or device, such as by the computer 102 of FIG. 1 or system 202 of FIG. 2. Although illustrated with discrete blocks, another exemplary operation associated with one or more blocks of the block diagram 500B may be divided into additional blocks, combined into fewer blocks, or eliminated, depending on the particular implementation.

At 508, an encoding operation is executed. In the encoding operation, the system 202 may be configured to control the first entity 204A to encode the media data 212. The encoding operation may include an audio data acquisition operation, a first ML model application operation, and a text data generation operation.

At 508A, the audio data acquisition operation is executed. Details about the audio data acquisition operation are provided, for example, in FIG. 5A.

At 508B, the first ML model application operation is executed. Details about the first ML model application operation are provided, for example, in FIG. 5A.

At 508C, the text data generation operation is executed. Details about the text data generation operation are provided, for example, in FIG. 5A.

At 510, the decoding operation is executed. In the decoding operation, the system 202 may be configured to control the second entity 204B to decode the encoded media data. The decoding operation may include a second ML application model, and a natural audio data generation operation.

At 510A, the second ML model application operation is executed. In the second ML application operation, the system 202 may be configured to control the second entity 204B to apply the second ML model 206B on the generated text data. In an embodiment of the disclosure, the system 202 may be configured to control the first entity 204A to input the generated text data to the second ML model 206B. Details about the application of the second ML model 206B are provided, for example, in FIG. 5B.

At 510B, the natural audio data generation operation is executed. In the natural audio data generation operation, the system 202 may be configured to control the second entity 204B to generate natural audio based on the generated text data. The natural audio data includes at least the second speech corresponding to the text included in the generated text data. Details about the generation of the natural audio data are provided, for example, in FIG. 5A.

At 512, a speech output operation is executed. In the speech output operation, the system may be configured to control the second entity 204B to output at least the second speech corresponding to the text included in the generated text data. Details about the generation of the natural audio data are provided, for example, in FIG. 5A.

In operation, the media data 212 are being received by the first entity 204A associated with the first participant 210A from the second entity 204B associated with the second participant 210B. However, the set of anomalies associated with the first entity 204A may occur during the reception of the media data 212 from the second entity 204B, leading to the distortions in the audio included in the media data 212 or the decrease in the resolution of the video included in the media data 212. Further, due to the distortions in the audio or the decrease in the resolution of the video, the first participant 210A associated with the first entity 204A may be unable to comprehend the media data 212 transmitted by the second participant 210B associated with the second entity 204B. Hence, to provide efficient communication between the first participant 210A and the second participant 210B, the system 202 may be configured to identify the set of anomalies associated with the first entity 204A and determine the set of operations to resolve the identified set of anomalies associated with the first entity 204A. Accordingly, a flowchart is provided with reference to FIG. 6.

Figure 6:
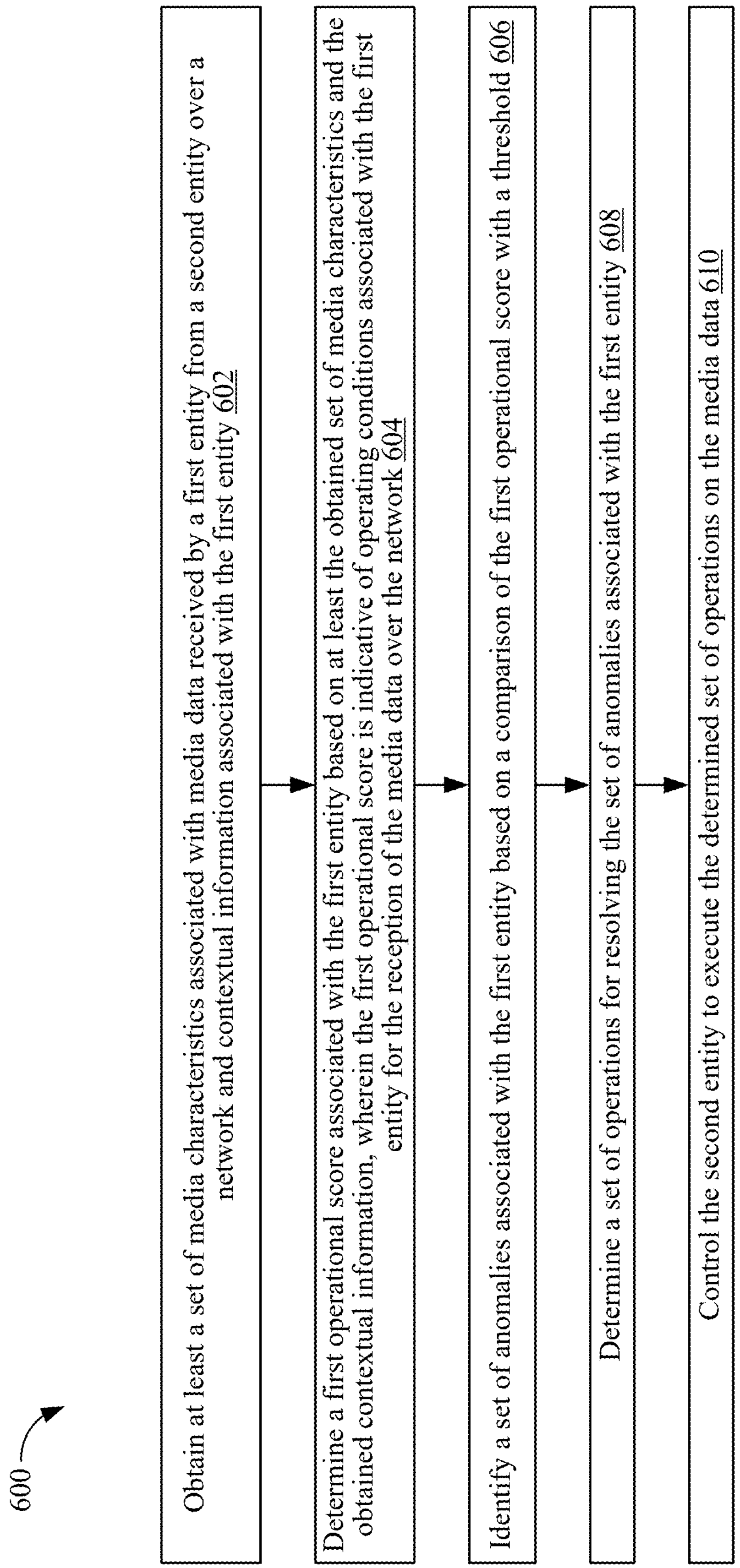
FIG. 6 is a flowchart of a method for identification and resolution of anomalies associated with reception of the media data over the network, in accordance with an embodiment of the disclosure.

FIG. 6 is a flowchart of a method for identification and resolution of anomalies associated with reception of the media data over the network, in accordance with an embodiment of the disclosure. FIG. 6 is explained in conjunction with elements from FIG. 1, FIG. 2, FIG. 3, FIG. 4, and FIG. 5. With reference to FIG. 6, there is shown a flowchart 600. The operations of the method may be executed by any computing system, for example, by the computer 102 of FIG. 1 or the system 202 of FIG. 2. The operations of the flowchart 600 may start at 602.

At 602, at least one of the set of media characteristics associated with the media data 212 is received from the first entity 204A from the second entity 204B over the WAN 104 and the contextual information associated with at least one of the first entity 204A or the second entity 204B are obtained. Details about the set of media characteristics and the contextual information are provided, for example, in FIG. 4.

At 604, the first operational score associated with the first entity 204A is determined based on the at least one of the obtained set of media characteristics and the obtained contextual information. The first operational score is indicative of operating conditions associated with the first entity 204A for the reception of the media data 212 over the WAN 104. The first operational score may be indicative of a performance metric score corresponding to a performance of the first entity 204A for the reception of the media data 212. In an embodiment of the disclosure, the first operational score may correspond to one or a combination of a data download score, the first audio comprehensibility score, and a second entity performance score. In an embodiment of the disclosure, the data download score may be indicative of the speed of the reception of the media data 212 from the second entity 204B. In an embodiment of the disclosure, the system 202 may be configured to determine the data download score based on the set of media characteristics. In an embodiment of the disclosure, the second entity performance score may be indicative of a performance of a hardware associated with the first entity 204A for the reception of the media data 212. In an embodiment of the disclosure, the system 202 may configured to determine the second entity performance score based on the entity information associated with the first entity 204A.

At 606, the set of anomalies associated with the first entity 204A is identified based on the comparison of the first operational score with a threshold. Details about the set of anomalies are provided, for example, in FIG. 4. In an example embodiment of the disclosure, based on a determination that the data download score is less than a data download score threshold, the system 202 may be configured to identify the set of anomalies associated with the first entity 204A.

At 608, the set of operations are determined to resolve the set of anomalies associated with the first entity 204A. Details about the set of operations are provided, for example, in FIGS. 4, 5A, and 5B.

At 610, the second entity is controlled to execute the determined set of operations on the media data 212. Control may pass to the end. Details about the execution of the determined set of operations are provided, for example, in FIG. 4, FIG. 5A and FIG. 5B.

In an embodiment of the disclosure, based on the first operational score, the system 202 may be configured to execute the encoding operation of the set of operations. The execution of the encoding operation may reduce the size of the media data 212, leading to the increase in the reception speed of the media data 212 at the first entity 204A. Accordingly, a diagram is provided with reference to FIG. 7.

Figure 7:
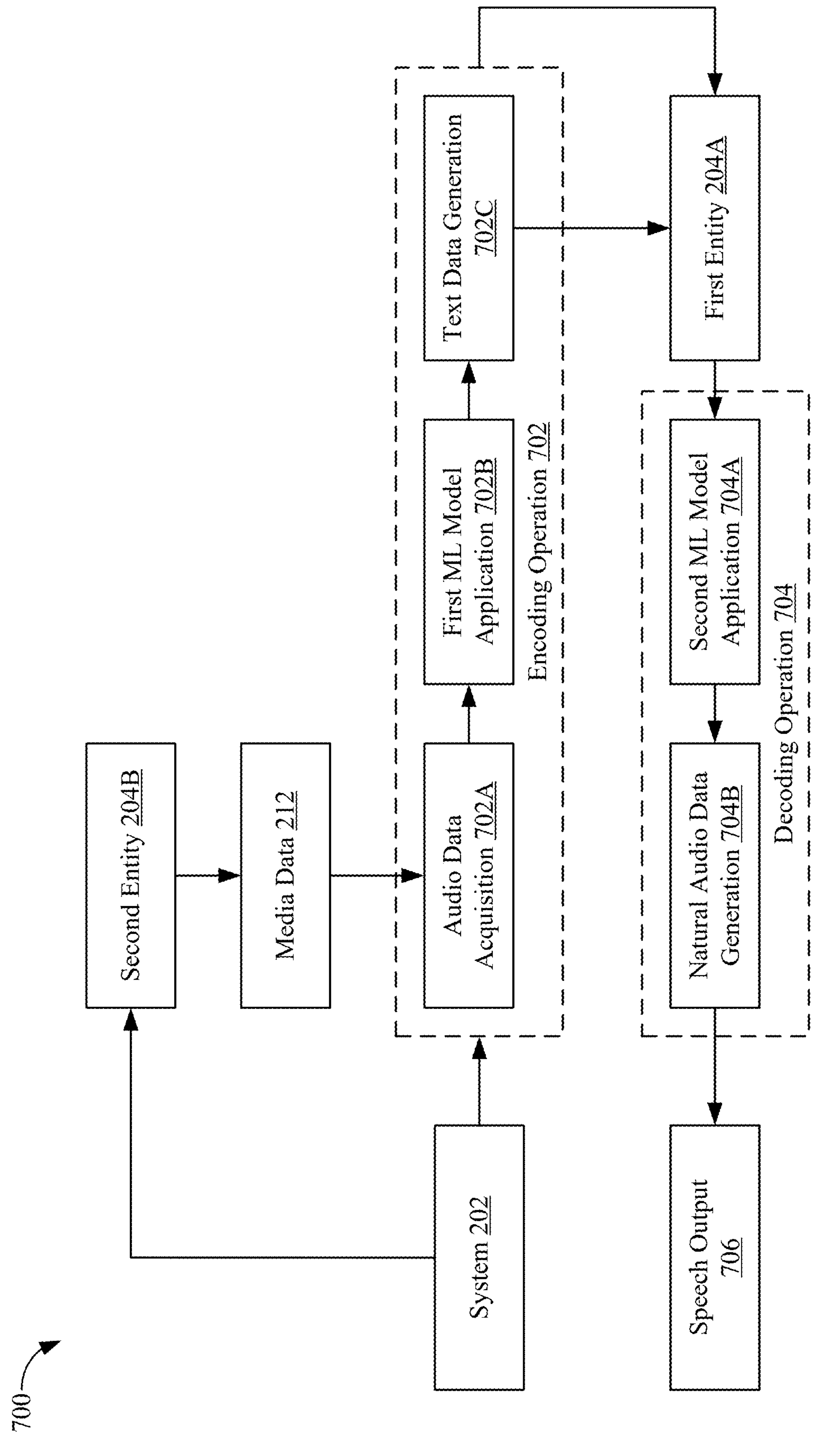
FIG. 7 is a diagram that illustrates exemplary operations to resolve the set of anomalies associated with the reception of the media data over the network, in accordance with an embodiment of the disclosure.

FIG. 7 is a diagram that illustrates exemplary operations to resolve a set of anomalies associated with the reception of the media data over the network, in accordance with an embodiment of the disclosure. FIG. 7 is explained in conjunction with elements from FIG. 1, FIG. 2, FIG. 3, FIG. 4, FIG. 5, FIG. 6, and FIG. 7. With reference to FIG. 7, there is shown a block diagram 700 that illustrates exemplary operations from 702 to 706, as described herein. The exemplary operations illustrated in the block diagram 700 may start at 702 and may be performed by any computing system, apparatus, or device, such as by the computer 102 of FIG. 1 or system 202 of FIG. 2. Although illustrated with discrete blocks, the exemplary operations associated with one or more blocks of the block diagram 700 may be divided into additional blocks, combined into fewer blocks, or eliminated, depending on the particular implementation.

At 702, an encoding operation is executed. In the encoding operation, the system 202 may be configured to encode the media data 212. In an embodiment of the disclosure, the system 202 may be configured to control the second entity 204B to encode the media data 212. The encoding operation may include an audio data acquisition operation, a first ML model application operation, and a text data generation operation.

At 702A, the audio data acquisition operation is executed. In the audio data acquisition operation, the system 202 may be configured to control the second entity 204B to obtain the audio data associated with the media data 212. Details about the audio data are provided, for example, in FIG. 5A, and FIG. 5B.

At 702B, the first ML model application operation is executed. In the first ML model application operation, the system 202 may be configured to control the second entity 204B to apply the first ML model 206A of the set of ML models 206 on the obtained audio data. In an embodiment of the disclosure, the system 202 may be configured to control the second entity 204B to input the obtained audio data to the first ML model 206A. As described in FIG. 2 and FIG. 5A, the first ML model 206A may correspond to the speech-to-text model. Details about the application of the first ML model 206A are provided, for example, in FIG. 5A and FIG. 5B.

At 702C, the text data generation operation is executed. In the text data generation operation, the system 202 may be configured to generate the text data. Details about the text data are provided, for example, in FIG. 5A, and FIG. 5B. In an embodiment of the disclosure, the system 202 may be configured to transmit the generated text data to the first entity 204A.

At 704, the decoding operation is executed. In the decoding operation, the system 202 may be configured to decode the encoded media data. In an embodiment of the disclosure, the system 202 may be configured to control the first entity 204A to decode the encoded media data. The decoding operation may include a second ML model application operation, and a natural audio data generation operation.

At 704A, the second ML model application operation is executed. In the second ML application operation, the system 202 may be configured to control the first entity 204A to apply the second ML model 206B on the generated text data. In an embodiment of the disclosure, the system 202 may be configured to control the first entity 204A to input the generated text data to the second ML model 206B. As described in FIG. 2 and FIG. 5A, the second ML model 206B may correspond to the text-to-speech model. Details about the application of the second ML model 206B are provided, for example, in FIG. 5A, and FIG. 5B.

At 704B, the natural audio data generation operation is executed. In the natural audio data generation operation, the system 202 may be configured to control the first entity 204A to generate natural audio based on the generated text data. The natural audio data includes at least the second speech corresponding to the text included in the generated text data. Details about the natural audio data are provided, for example, in FIG. 5A, and FIG. 5B.

At 706, a speech output operation is executed. In the speech output operation, the system may be configured to control the first entity 204A to output at least the second speech corresponding to the text included in the generated text data.

In operation, the media data 212 are being communicated between the first entity 204A associated with the first participant 210A and the second entity 204B associated with the second participant 210B via the system 202. However, a set of anomalies associated with the system 202 may occur during the communication of the media data 212, leading to the distortions in the audio included in the media data 212 or the decrease in the resolution of the video included in the media data 212. Further, due to the distortions in the audio or the decrease in the resolution of the video, the first participant 210A or the second participant 210B may be unable to comprehend the media data 212. Hence, to provide efficient communication between the first participant 210A and the second participant 210B, the system 202 may be configured to identify the set of anomalies associated with the first entity 204A and determine the set of operations to resolve the identified set of anomalies associated with the system 202. Accordingly, a flowchart is provided with reference to FIG. 3.

Figure 8:
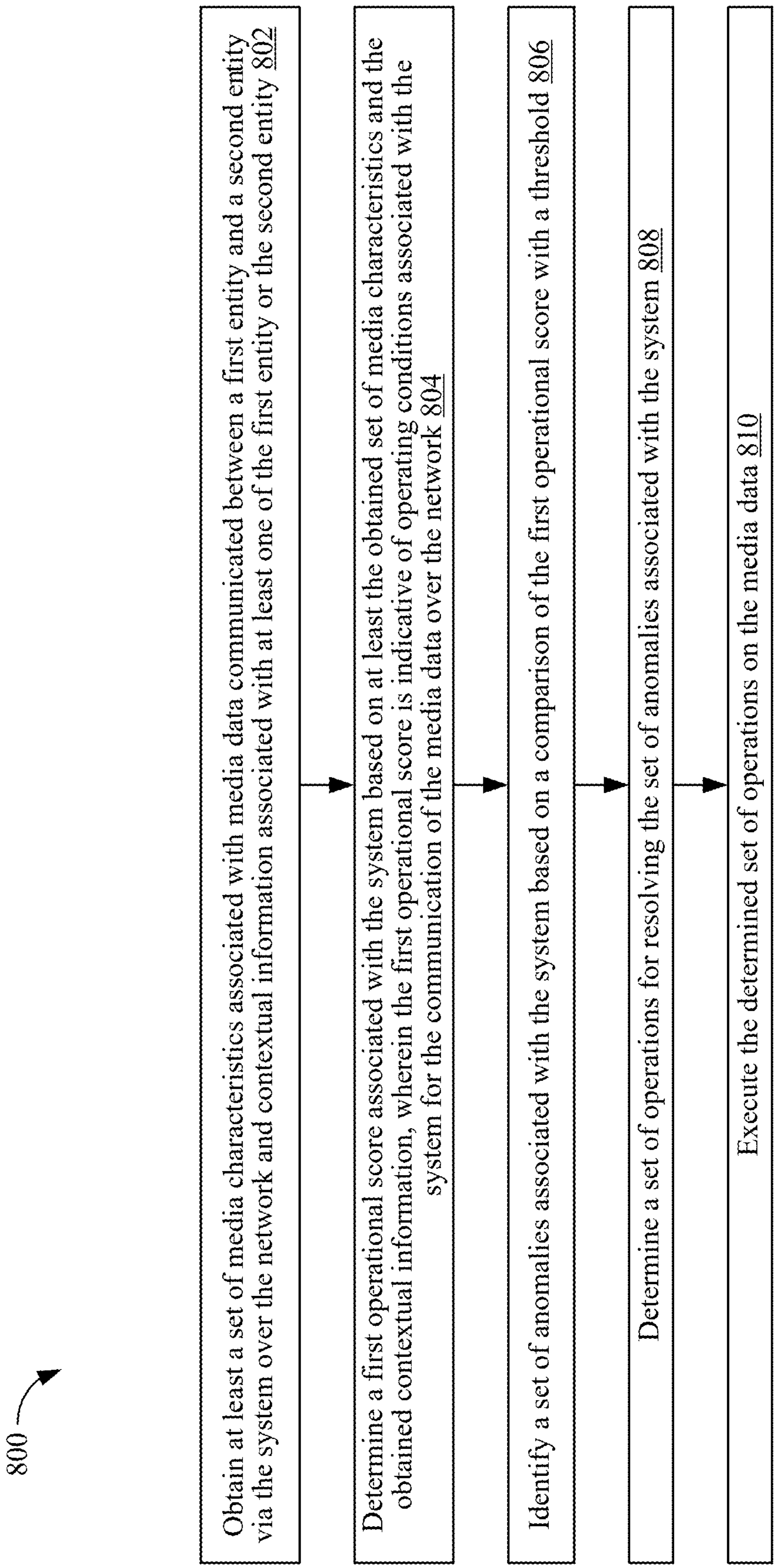
FIG. 8 is a flowchart of a method for identification and resolution of anomalies associated with communication of the media data via a system, in accordance with an embodiment of the disclosure.

FIG. 8 is a flowchart that illustrates a third exemplary method for identification and resolution of anomalies over the network, in accordance with an embodiment of the disclosure. FIG. 9 is explained in conjunction with elements from FIG. 1, FIG. 2, FIG. 3, FIG. 4, FIG. 5, FIG. 6, and FIG. 7. With reference to FIG. 8, there is shown a flowchart 800. The operations of the exemplary method may be executed by any computing system, for example, by the computer 102 of FIG. 1 or the system 202 of FIG. 2. The operations of the flowchart 800 may start at 802.

At 802, at least one of the set of media characteristics associated with the media data 212 communicated between the first entity 204A and the second entity 204B via the system 202 and the contextual information associated with at least one of the first entity 204A or the second entity 204B are obtained. Details about the acquisition of at least one of the set of media characteristics and the contextual information are provided, for example, in FIG. 4.

At 804, the first operational score associated with the system 202 is determined based on the at least one of the obtained set of media characteristics and the obtained contextual information. In an embodiment of the disclosure, the first operational score may be indicative of a performance score corresponding to a performance score of the system 202 for the communication of the media data 212. In an embodiment of the disclosure, the first operational score associated with the system may correspond to one or a combination of the first audio comprehensibility score, and a system performance score. In an embodiment of the disclosure, the system performance score may be indicative of a performance of a hardware associated with the system 202 for the communication of the media data 212.

At 806, the set of anomalies associated with the system 202 is identified based on the comparison of the first operational score with the threshold. In an embodiment of the disclosure, the set of anomalies associated with the system 202 includes the increase in the packet loss associated with the communicated media data 212, the increase in the traffic over the WAN 104, and the fault event associated with the server (such as hardware failure).

At 808, the set of operations are determined to resolve the set of anomalies associated with the system 202. Details about the set of operations are provided, for example, in FIG. 4.

At 810, the determined set of operations is executed on the media data 212. Control may pass to the end.

Figure 9A:
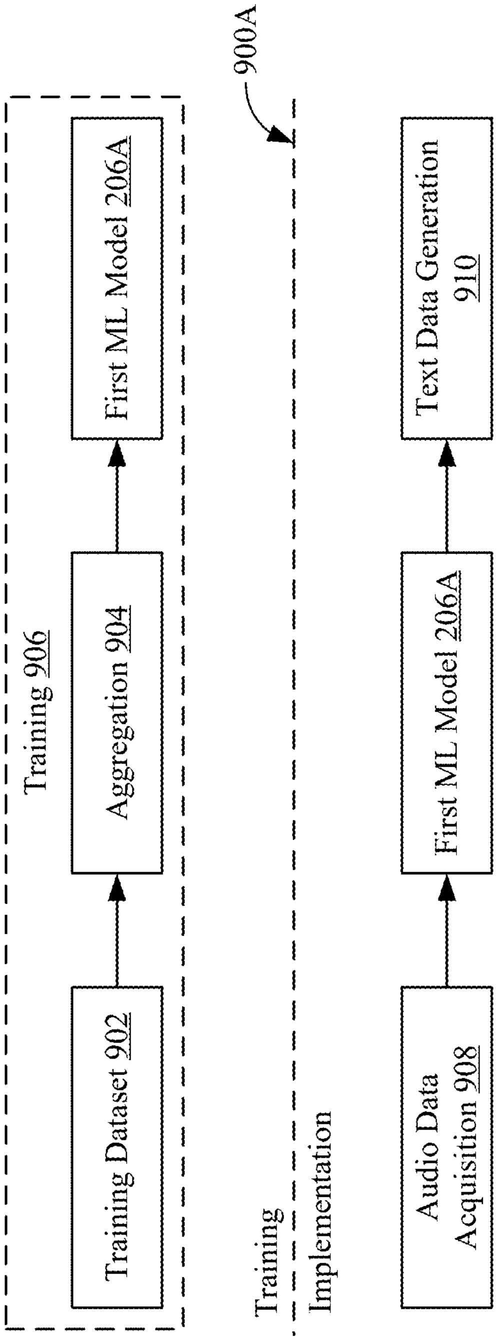
FIG. 9A is a diagram depicting training of a first machine learning (ML) model for generation of text data, in accordance with an embodiment of the disclosure.

FIG. 9A is a diagram depicting training 906 of the first ML model 206A for generation of text data, in accordance with an embodiment of the disclosure. As shown, there is a training portion above line 900A and an implementation portion below line 900A. In the training portion above line 900A, the first ML model 206A is trained based on the training data 902. The training data 902 includes at least one of a first data set including historical data associated with historical communication events between the first entity 204A and the second entity 204B or a second data set including training speech data associated with the second participant 210B associated with the second entity 204B. The training speech data may include a first training speech of the second participant 210B corresponding to a first set of pre-defined texts. In an embodiment of the disclosure, the system 202 may be configured to control the second entity 204B to obtain the training speech of the second participant 210B. The training data 902 may further include a lexicon of words for training 906 the first ML model 206A. Further, one or more phonetic transcriptions may be associated with each word of the lexicon of words. A phonetic transcription may correspond to a set of symbols associated with a pronunciation of one or more words of the lexicon of words. In an embodiment of the disclosure, the one or more phonetic transcriptions may indicate subtle differences in the pronunciation of the one or more words of the lexicon of words by the one or more participants (such as the first participant 210A). In another embodiment of the disclosure, the one or more phonetic transcriptions may further indicate variations associated with the accents of the one or more transcriptions. In yet another embodiment of the disclosure, the one or more phonetic transcriptions may indicate speech patterns of the one or more participants 210. By the way of an example and not limitation, the word "cat" is transcribed phonetically as/kæt/.

In an embodiment of the disclosure, the system 202 may be configured to aggregate 904 the training data 902 for the training 906 of the first ML model 206A. The system 202 may be configured to perform one or more operations to aggregate 904 the training data 902. The one or more operations may include at least one of a data cleaning operation, a data transformation operation, a data integration operation, a data reduction operation, a feature generation operation, a feature selection operation, a feature scaling operation, a data labeling operation, a data augmentation operation, and a data storage operation. Further, the system 202 may be configured to input the aggregated training data to the first ML model 206A. The aggregated training data may include a set of acoustic features associated with the first training speech of the first participant 210A. The set of acoustic features may include, but is not limited to, spectral features associated with a power spectrum of the training speech, temporal features associated with temporal characteristics of the first training speech, articulatory features associated with a movement of speech organs (such as tongue, lips, and vocal cords) of the one or more participants 210. In an example embodiment of the disclosure, the spectral features may include, but are not limited to, mel-frequency cepstral coefficients (MFCCs), spectrograms, chroma features, and formants. In another example embodiment of the disclosure, the temporal features may include, but is not limited to, a pitch of the first training speech over a time period, a duration of the first training speech, and an amplitude of the first training speech over the time period.

In an embodiment of the disclosure, for the training 906 of the first ML model 206A, the system 202 may be configured to input the set of acoustic features to the first ML model 206A. In an embodiment of the disclosure, the first ML model 206A is trained to map the set of acoustic features to the one or more words of the lexicon of words. Additionally, or alternatively, the first ML model 206A is trained to map the set of acoustic features with the one or more phonetic transcriptions. The training 906 may include iteratively updating the model parameters associated with the first ML model 206A to minimize a loss between predicted one or more phonetic transcriptions and actual one or more phonetic transcriptions. The system 202 may employ one or more training techniques for the training 906 of the first ML model 206A. The one or more training techniques may include, but are not limited to, a backpropagation technique, a connectionist temporal classification (CTC) technique, and the like. In the backpropagation technique, gradients of a first loss function are propagated through the first ML model 206A to update weights and biases. The weight and biases may be associated with one or more layers of the first ML model 206A. In the CTC technique, a probability distribution is generated for each possible output text sequence at each time step, rather than a single predicted text sequence output. The CTC may utilize a special "blank" symbol to output a non-character at a time step for variable-length alignments between the input and each possible output text sequence. In an embodiment of the disclosure, the first ML model 206A is trained to extract error patterns in the first training speech. The errors patterns may be associated with an incorrect pronunciation of the set of first set of pre-defined texts or jitters in the first training speech. Further, the first ML model 206A is further trained to generate the text data by resolving the extracted error patterns in the first training speech.

Further, in the implementation portion below line 900A, the system 202 may be configured to execute an audio data acquisition operation 908. The audio data acquisition operation 908 may include obtaining the audio data from the media data 212 transmitted from the first entity 204A to the second entity 204B.

In an embodiment of the disclosure, the system 202 may be further configured to input the obtained audio data to the first ML model 206A. In an embodiment of the disclosure, the system 202 may be configured to control the plurality of entities 204 to input the obtained audio data to the first ML model 206A. As described in the training portion above line 900A, the first ML model 206A is trained to generate the text data.

In an embodiment of the disclosure, the system 202 may be configured to execute a text data generation operation 910. In the text data generation operation 910, the system 202 may be configured to generate the text data based on an application of the first ML model 206A on the obtained audio data. In an embodiment of the disclosure, the system 202 may be configured to apply the first ML model 206A on the obtained audio data. In another embodiment of the disclosure, the system 202 may be configured to control at least one entity of the pluralities of entities 204 to apply the first ML model 206A on the obtained audio data. In an example embodiment of the disclosure, the system 202 may be configured to control the first entity 204A to apply the first ML model 206A on the obtained audio data.

In an embodiment of the disclosure, the system 202 may be configured to control the pluralities of entities to obtain a first user input from the respective participant of each entity of the plurality of entities 204. The first user input indicative of the performance of the first ML model 206A corresponding to the generation of the text data from the audio data. In an embodiment of the disclosure, the system 202 may be configured to determine a first ML performance score based on the first user input. The system 202 may be further configured to control the pluralities of entities to obtain a second training speech corresponding to a second set of pre-determined sentences.

Figure 9B:
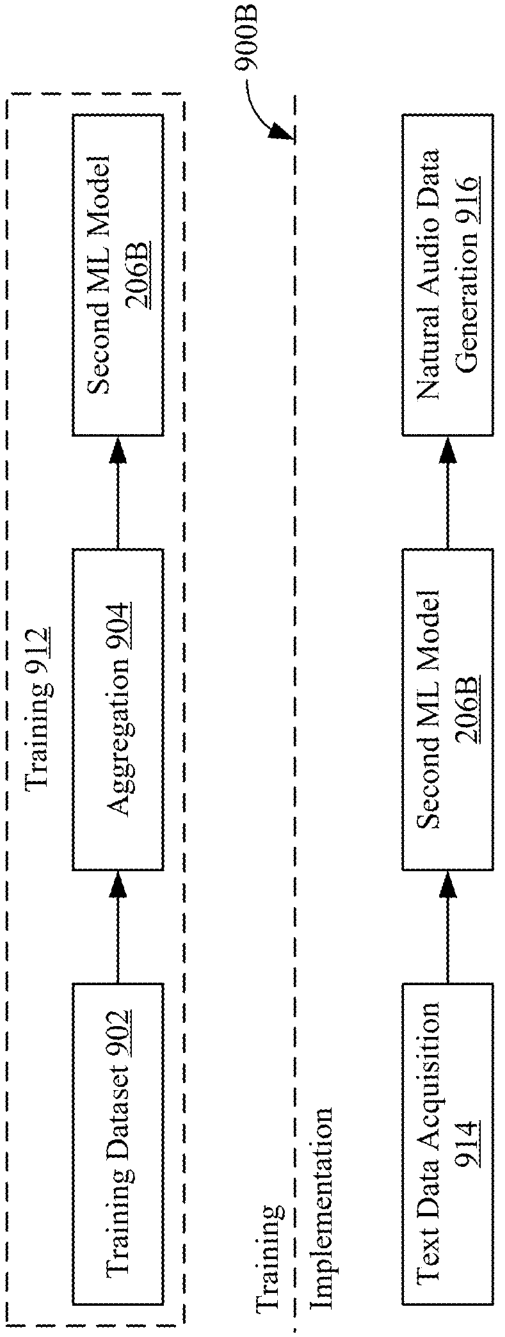
FIG. 9B is a diagram depicting training of a second ML model for generation of natural audio data, in accordance with an embodiment of the disclosure.

FIG. 9B is a diagram depicting training 912 of the second ML model 206B for generation of natural audio data, in accordance with an embodiment of the disclosure. As shown, there is a training portion above line 900B and an implementation portion below line 900B. In the training portion above line 900B, the second ML model 206B is trained based on the training data 902. Details about the training data 902 are provided, for example, in FIG. 9B. The training data 902 may further includes training text data. The training text data may include a set of training texts. The training text data may further include a set linguistics features associated with a structure of a language. The set of linguistic features may include, but is not limited to, phonological features (such as phonemes, allophones, stress patterns, intonation prosody, and the like), morphological features (such as morphemes, inflections, and the like), and syntactic features (a part of speech, a phrase hierarchy, a set of syntax rules, and the like). In an embodiment of the disclosure, the system 202 may be configured to aggregate 904 the training data 902. Details about the aggregation 904 of the training data 902 are provided, for example, in FIG. 9A. The aggregated training data may further include the set of acoustic features and the set of linguistic features. In an embodiment of the disclosure, for the training 912 of the second ML model 206B, the system 202 may be configured to input the aggregated training data to the second ML model 206B. In an embodiment of the disclosure, the second ML model 206B is trained to generate, based on the training text data, a sequence of mel-spectrograms. The sequence of mel spectrograms may be indicative of a frequency pattern associated with audio corresponding to the set of training texts. Further, the second ML model 206B is trained to generate, based on the set of mel spectrograms, an audio waveform corresponding to the training speech associated with the first participant 210A. The system 202 may employ the one or more training techniques for the training 912 of the second ML model 206B. The one or more training techniques may include, but are not limited to, the back-propagation technique, an adversarial technique, and the like. In the backpropagation technique, gradients of a second loss function are propagated through the second ML model 206B to update weights and biases. The weight and biases may be associated with one or more layers of the second ML model 206B. In the adversarial technique, a generator is employed to generate synthetic audio associated with the training speech and a discriminator is employed to compare the synthetic audio and the training speech for the training 912 of the second ML model 206B.

Further, in the implementation portion below line 900B, the system 202 may be configured to execute a text data acquisition operation 914. The text data acquisition operation 914 may include obtaining of the text data from an output of the first ML model 206A.

In an embodiment of the disclosure, the system 202 may be further configured to input the obtained text data to the second ML model 206B. In an embodiment of the disclosure, the system 202 may be configured to control the pluralities of entities 204 to input the obtained text data to the second ML model 206B. As described in the training portion above line 900B, the second ML model 206B is trained to generate the natural audio data.

In an embodiment of the disclosure, the system 202 may be configured to execute a natural audio data generation operation 916. In the natural audio data generation operation 916, the system 202 may be configured to generate the natural audio data based on an application of the second ML model 206B on the obtained text data. In an embodiment of the disclosure, the system 202 may be configured to apply the second ML model 206B on the obtained text data. In another embodiment of the disclosure, the system 202 may be configured to control at least one entity of the pluralities of entities 204 to apply the second ML model 206B on the obtained text data. In an example embodiment of the disclosure, the system 202 may be configured to control the second entity 204B to apply the second ML model 206B on the obtained text data.

In an embodiment of the disclosure, the system 202 may be configured to control the pluralities of entities to obtain a second user input from the respective participant of each entity of the plurality of entities 204. The second user input indicative of a performance of the second ML model 206B corresponding to the generation of the natural audio data from the text data.

In an embodiment of the disclosure, the system 202 may be configured to determine a second ML performance score based on the second user input. The system 202 may be further configured to control the pluralities of entities to obtain the second training speech corresponding to the second set of pre-determined sentences.

In an embodiment of the disclosure, the system 202 may be configured to obtain the contextual information including the context cue information after the execution of the set of operations. In an embodiment of the disclosure, the context cue information may further include one or more third texts indicative of continuity in the inability of the second participant 210B to comprehend the media data 212. Further, the system 202 may be configured to validate at least one of the first ML model 206A or the second ML model 206B based on a comparison of a number of the one or more third texts indicative of the continuity in the inability of the second participant 210B to comprehend the media data 212 with a number of the one or more third texts indicative of the inability of the second participant 210B to comprehend the media data 212 before the execution of the set of operations. In another embodiment of the disclosure, the one or more third texts may be indicative of an enhancement in the ability of the second participant 210B to comprehend the media data 212. In an example embodiment of the disclosure, if the number of the one or more third texts indicative of the continuity in the inability of the second participant 210B to comprehend the media data 212 is 0, then the system 202 may determine that the resolution of the anomalies over the WAN 104 is effective. By the way of an example, not limitation, the one or more third texts may correspond to "Ok now it's better" or "Yes I can hear you now." Further, the system 202 may be configured to validate at least one of the first ML model 206A, and the second ML model 206B based on the one or more third texts indicative of the enhancement in the ability of the second participant 210B to comprehend the media data 212.

In an embodiment of the disclosure, the system 202 may be configured to control the first entity 204A to obtain a third user input corresponding to the execution of the determined set of solutions. The third user input may be associated with the first participant 210A. In an embodiment of the disclosure, the third user input may be indicative of a selection of the second participant 210B to enable or disable the execution of the determined set of operations on the first entity 204A. In an embodiment of the disclosure, the system 202 may be configured to validate at least one of the first ML model 206A or the second ML model 206B based on the third user input.

Various embodiments of the disclosure may provide a non-transitory computer readable medium and/or storage medium having stored thereon, instructions executable by a machine and/or a computer to operate a system (e.g., the system 202) for identification and resolution of anomalies over the network. The instructions may cause the machine and/or computer to perform operations that include obtaining, by a computer, at least a set of media characteristics associated with media data transmitted from a first entity to a second entity over a network and contextual information associated with at least one of the first entity or the second entity. The operations further include determining a first operational score associated with the first entity based on at least the obtained set of media characteristics, the obtained contextual information, and the obtained entity information. The first operational score is indicative of operating conditions associated with the first entity for the transmission of the media data over the network. The operations further include identifying a set of anomalies associated with the first entity based on a comparison of the first operational score with a threshold. The operations further include determining a set of operations for resolving the set of anomalies associated with the first entity. The operations further include controlling the first entity to execute the determined set of operations on the media data.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
- obtaining, by a computer, at least a set of media characteristics and contextual information, wherein
  - the set of media characteristics is associated with media data transmitted from a first entity to a second entity over a network, and
  - the contextual information is associated with at least one of the first entity or the second entity;
- determining, by the computer, an operational score associated with the first entity based on at least the obtained set of media characteristics and the obtained contextual information, wherein
  - the operational score is indicative of operating conditions associated with the first entity for the transmission of the media data over the network,
  - the determining of the operational score comprises:
    - determining a marginal score by subtracting a conversation cue score from an audio comprehensibility score; and
    - adding the marginal score to a data upload score,
  - the data upload score is indicative of a speed of the transmission of the media data from the first entity,
  - the audio comprehensibility score is indicative of a quality of an audio included in the media data, and
  - the conversation cue score is indicative of an inability of a participant associated with the second entity to comprehend the media data transmitted from the first entity;
- comparing, by the computer, the operational score with a threshold;
- identifying, by the computer, a set of anomalies associated with the first entity based on the comparing of the first operational score with the threshold;
- determining, by the computer, a set of operations for resolving the set of anomalies associated with the first entity; and
- controlling, by the computer, the first entity to execute the determined set of operations on the media data.

2. The computer-implemented method of claim 1, wherein the contextual information comprises context cue information indicative of a comprehension of at least a portion of the media data by the participant associated with the second entity.

3. The computer-implemented method of claim 1, wherein the set of media characteristics is selected from the group consisting of a type of the media data, a resolution of the media data, a duration of media associated with the media data, timestamp data of the media associated with the media data, first bandwidth data associated with the transmission of the media data from the first entity, second bandwidth data associated with reception of the media data at the second entity, a rate of packet loss associated with communication of the media data, and an encryption state of the media data.

4. The computer-implemented method of claim 1, further comprising:
- obtaining, by the computer, entity information associated with the first entity and the second entity, wherein the entity information is selected from the group consisting of entity type information, entity identifier information, entity network information, entity location information, entity participant data, entity resource information, and entity status information.

5. The computer-implemented method of claim 1, wherein the set of operations is selected from the group consisting of an encoding operation, a decoding operation, a backup operation, a session re-initiation operation, a bandwidth throttling operation, a rate limiting operation, and a load balancing operation.

6. The computer-implemented method of claim 5, wherein the encoding operation comprises:
- controlling, by the computer, the first entity to obtain audio data associated with the media data, wherein the audio data comprises at least a first speech of a participant associated with the first entity; and
- controlling, by the computer, the first entity to generate text data comprising at least a text corresponding to the first speech of the participant associated with the first entity, wherein the text data is generated based on the obtained audio data, and wherein a size of the text data is less than a size of the audio data.

7. The computer-implemented method of claim 6, wherein the text data further comprises a set of speech characteristics of the first speech of the participant associated with the first entity, and wherein the set of speech characteristics is selected from the group consisting of a tone of the first speech, a pitch of the first speech, a rate of the first speech, an intensity of the first speech, a total number of words in the first speech, an accent in the first speech, and a pattern of pauses in the first speech.

8. The computer-implemented method of claim 6, wherein the encoding operation further comprises:
- controlling, by the computer, the first entity to generate the text data, wherein the text data is generated based on an application of a set of machine learning (ML) models on the obtained audio data.

9. The computer-implemented method of claim 8, wherein the set of ML models comprises a first ML model trained to generate the text data, and wherein the text data is generated based on at least the first speech of the participant associated with the first entity included in the obtained audio data.

10. The computer-implemented method of claim 8, wherein the decoding operation comprises:
- generating, by the computer, natural audio data based on the generated text data, wherein the natural audio data comprises at least a second speech corresponding to the text included in the generated text data.

11. The computer-implemented method of claim 10, wherein the decoding operation further comprises:
- generating, by the computer, the natural audio data based on application of the set of ML models on the generated text data, wherein the set of ML models further comprises a second ML model trained to generate the natural audio data, and wherein the natural audio data is generated based on at least the text included in the generated text data.

12. The computer-implemented method of claim 11, further comprising:

controlling, by the computer, the second entity to output at least the second speech corresponding to the text included in the generated text data.

13. The computer-implemented method of claim 11, wherein the set of ML models is trained based on training data, and wherein the training data comprises at least one of a first data set comprising historical data associated with historical communication events between the first entity and the second entity over the network, or a second data set comprising training speech data of the participant associated with the first entity.

14. The computer-implemented method of claim 1, further comprising:

determining, by the computer, a set of performance scores based on each operation of the set of operations;

selecting, by the computer, an operation of the set of operations, wherein a performance score of the operation is highest among the set of performance scores; and controlling, by the computer, the first entity to execute the selected operation of the set of operations on the media data.

15. A system, comprising:

a processor set configured to:

obtain at least a set of media characteristics and contextual information, wherein the set of media characteristics is associated with media data transmitted from a first entity to a second entity over a network, and the contextual information is associated with at least one of the first entity or the second entity;

determine an operational score associated with the first entity based on at least the obtained set of media characteristics and the obtained contextual information, wherein the operational score is indicative of operating conditions associated with the first entity for the transmission of the media data over the network, the determination of the operational score comprises:

determination of a marginal score by subtraction of a conversation cue score from an audio comprehensibility score; and addition of the marginal score to a data upload score, the data upload score is indicative of a speed of the transmission of the media data from the first entity, the audio comprehensibility score is indicative of a quality of an audio included in the media data, and the conversation cue score is indicative of an inability of a participant associated with the second entity to comprehend the media data transmitted from the first entity;

compare the operational score with a threshold;

identify a set of anomalies associated with the first entity based on the comparison of the operational score with the threshold;

determine a set of operations to resolve the set of anomalies associated with the first entity; and control the first entity to execute the determined set of operations on the media data.

16. The system of claim 15, wherein the contextual information comprises context cue information indicative of a comprehension of at least a portion of the media data by the participant associated with the second entity.

17. The system of claim 15, wherein the set of operations is selected from the group consisting of an encoding operation, a decoding operation, a backup operation, a session re-initiation operation, a bandwidth throttling operation, a rate limiting operation, and a load balancing operation.

18. The system of claim 17, wherein to execute the encoding operation the processor set is further configured to:

control the first entity to obtain audio data associated with the media data, wherein the audio data comprises at least a first speech of a participant associated with the first entity; and generate text data based on the obtained audio data, wherein the text data comprises at least a text corresponding to the first speech of the participant associated with the first entity, and wherein a size of the text data is less than a size of the audio data.

19. The system of claim 18, wherein to execute the decoding operation the processor set is further configured to:

control the second entity to generate natural audio data comprising at least a second speech corresponding to the text included in the generated text data, wherein the natural audio data is generated based on the generated text data.

20. A computer program product for identification and resolution of anomalies over a network, the computer program product comprising a computer-readable storage medium having program instructions embodied therewith, the program instructions executable by a system to cause the system to:

obtain at least a set of media characteristics and contextual information, wherein the set of media characteristics is associated with media data communicated from a first entity to a second entity via the system over the network, and the contextual information is associated with at least one of the first entity or the second entity;

determine an operational score associated with the first entity based on at least the obtained set of media characteristics and the obtained contextual information, wherein the operational score is indicative of operating conditions associated with the first entity for the communication of the media data over the network, the determination of the operational score comprises:

determination of a marginal score by subtraction of a conversation cue score from an audio comprehensibility score; and addition of the marginal score to a data upload score, the data upload score is indicative of a speed of the communication of the media data from the first entity, the audio comprehensibility score is indicative of a quality of an audio included in the media data, and the conversation cue score is indicative of an inability of a participant associated with the second entity to comprehend the media data communicated from the first entity;

compare the operational score with a threshold;

identify a set of anomalies associated with the first entity based on the comparison of the operational score with the threshold;

determine a set of operations to resolve the set of anomalies associated with the first entity; and control the first entity to execute the determined set of operations on the media data.

* * * * *